(12) United States Patent
Zhang et al.

(10) Patent No.: US 12,010,321 B2
(45) Date of Patent: Jun. 11, 2024

(54) AFFINE BASED MERGE WITH MVD

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

(*) Notice: Subject to any disclaimer, the term of this patent is extended or adjusted under 35 U.S.C. 154(b) by 126 days.

(21) Appl. No.: 17/372,968

(22) Filed: Jul. 12, 2021

(65) Prior Publication Data
US 2021/0352293 A1    Nov. 11, 2021

Related U.S. Application Data

(63) Continuation of application No. PCT/CN2020/071440, filed on Jan. 10, 2020.

(30) Foreign Application Priority Data

Jan. 10, 2019   (WO) ................ PCT/CN2019/071159

(51) Int. Cl.
*H04N 19/137*    (2014.01)
*H04N 19/119*    (2014.01)
(Continued)

(52) U.S. Cl.
CPC ......... *H04N 19/137* (2014.11); *H04N 19/119* (2014.11); *H04N 19/176* (2014.11);
(Continued)

(58) Field of Classification Search
CPC .. H04N 19/137; H04N 19/119; H04N 19/176; H04N 19/46
See application file for complete search history.

(56) References Cited

U.S. PATENT DOCUMENTS

| 10,448,010 B2 | 10/2019 | Chen et al. |
|---|---|---|
| 10,560,712 B2 | 2/2020 | Zou et al. |

(Continued)

FOREIGN PATENT DOCUMENTS

| CN | 101257625 A | 9/2008 |
|---|---|---|
| CN | 102148990 A | 8/2011 |

(Continued)

OTHER PUBLICATIONS

Jeong et al.—Proposed WD for CE4 Ultimate motion vector expression (Test 4.5.4) Document: JVET-L0054_WD—Joint Video Experts Team (JVET) of ITU-T SG 16 WP 3 and ISO/IEC JTC 1/SC 29/WG 11 12th Meeting: Macao, CN, Oct. 3-12, 2018.*

(Continued)

*Primary Examiner* — Fabio S Lima
(74) *Attorney, Agent, or Firm* — Perkins Coie LLP

(57) ABSTRACT

Disclosed and systems, methods and devices for video processing. An exemplary method for video processing includes: determining for a current video block, an indication which indicates that an affine merge with motion vector difference (MMVD) mode is applied to the current video block; performing a conversion between the current video block and a bitstream representation of a current video block based on the indication, the indication being activated based on the usage of at least one merge list for the current video block.

18 Claims, 16 Drawing Sheets

(51) Int. Cl.
*H04N 19/176* (2014.01)
*H04N 19/184* (2014.01)
*H04N 19/46* (2014.01)
*H04N 19/52* (2014.01)

(52) U.S. Cl.
CPC .......... *H04N 19/184* (2014.11); *H04N 19/46* (2014.11); *H04N 19/52* (2014.11)

(56) References Cited

U.S. PATENT DOCUMENTS

| | | | |
|---|---|---|---|
| 10,757,417 | B2 | 8/2020 | Zhang et al. |
| 10,778,999 | B2 | 9/2020 | Li et al. |
| 10,841,609 | B1 | 11/2020 | Liu et al. |
| 2005/0179572 | A1 | 8/2005 | Winger |
| 2010/0189181 | A1 | 7/2010 | Zheng et al. |
| 2012/0106638 | A1 | 5/2012 | Su |
| 2012/0147961 | A1 | 6/2012 | Guo et al. |
| 2012/0328209 | A1 | 12/2012 | Sasai et al. |
| 2013/0034167 | A1 | 2/2013 | Zheng |
| 2013/0070855 | A1 | 3/2013 | Zheng et al. |
| 2013/0156328 | A1 | 6/2013 | Karczewicz et al. |
| 2013/0272377 | A1* | 10/2013 | Karczewicz ............ H03M 7/30 341/51 |
| 2014/0146876 | A1 | 5/2014 | Takehara et al. |
| 2014/0161186 | A1 | 6/2014 | Zhang et al. |
| 2016/0360225 | A1 | 12/2016 | Diggins et al. |
| 2017/0006302 | A1 | 1/2017 | Lee et al. |
| 2017/0324978 | A1 | 11/2017 | Xu et al. |
| 2017/0332095 | A1 | 11/2017 | Zou et al. |
| 2017/0339425 | A1 | 11/2017 | Jeong et al. |
| 2018/0077417 | A1 | 3/2018 | Huang |
| 2018/0091816 | A1 | 3/2018 | Chien et al. |
| 2018/0098063 | A1 | 4/2018 | Chen et al. |
| 2018/0098089 | A1 | 4/2018 | Chen et al. |
| 2018/0262760 | A1 | 9/2018 | Zhang et al. |
| 2018/0270485 | A1 | 9/2018 | Jang et al. |
| 2018/0332289 | A1 | 11/2018 | Huang |
| 2018/0352223 | A1 | 12/2018 | Chen et al. |
| 2018/0359483 | A1 | 12/2018 | Chen et al. |
| 2019/0132605 | A1 | 5/2019 | Deng et al. |
| 2019/0387250 | A1 | 12/2019 | Boyce et al. |
| 2020/0045310 | A1 | 2/2020 | Chen et al. |
| 2020/0145688 | A1 | 5/2020 | Zou et al. |
| 2020/0213594 | A1 | 7/2020 | Liu et al. |
| 2020/0213612 | A1 | 7/2020 | Liu et al. |
| 2020/0359029 | A1 | 11/2020 | Liu et al. |
| 2020/0382771 | A1 | 12/2020 | Liu et al. |
| 2020/0382795 | A1 | 12/2020 | Zhang et al. |
| 2020/0396453 | A1 | 12/2020 | Zhang et al. |
| 2020/0396465 | A1 | 12/2020 | Zhang et al. |
| 2021/0006824 | A1 | 1/2021 | Jeong et al. |
| 2021/0306659 | A1* | 9/2021 | Lai .................. H04N 19/105 |
| 2021/0352314 | A1 | 11/2021 | Zhang et al. |
| 2022/0232216 | A1* | 7/2022 | Choi .................. H04N 19/70 |

FOREIGN PATENT DOCUMENTS

| | | |
|---|---|---|
| CN | 102447902 A | 5/2012 |
| CN | 102934434 A | 2/2013 |
| CN | 103583048 A | 12/2014 |
| CN | 104247432 A | 12/2014 |
| CN | 106031175 A | 10/2016 |
| CN | 106358029 A | 1/2017 |
| CN | 106537915 A | 3/2017 |
| CN | 106797476 A | 5/2017 |
| CN | 107113424 A | 8/2017 |
| CN | 107113440 A | 8/2017 |
| CN | 108141604 A | 6/2018 |
| CN | 108353184 A | 7/2018 |
| CN | 108886618 A | 11/2018 |
| CN | 109120928 A | 1/2019 |
| CN | 109155855 A | 1/2019 |
| EP | 2725796 A1 | 4/2014 |
| EP | 3264768 A1 | 1/2018 |
| EP | 3301918 A1 | 4/2018 |
| EP | 3355578 A1 | 8/2018 |
| EP | 3422720 A1 | 1/2019 |
| IN | 108432250 A | 8/2018 |
| KR | 20160143584 A | 12/2016 |
| WO | 2015106121 A1 | 7/2015 |
| WO | 2016034058 A1 | 3/2016 |
| WO | 2017039117 A1 | 3/2017 |
| WO | 2017076221 A1 | 5/2017 |
| WO | 2017118409 A1 | 7/2017 |
| WO | 2017148345 A1 | 9/2017 |
| WO | 2017157259 A1 | 9/2017 |
| WO | 2018064524 A1 | 4/2018 |
| WO | 2018065296 A1 | 4/2018 |
| WO | 2018117546 A1 | 6/2018 |
| WO | 2018128380 A1 | 7/2018 |
| WO | 2018226066 A1 | 12/2018 |

OTHER PUBLICATIONS

Bossen et al. "JVET Common Test Conditions and Software Reference Configurations for SDR Video," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1010, 2018.

Bross et al. "Versatile Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "CE4: Common Base for Affine Merge Mode (Test 4.2.1," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0366, 2018.

Han et al. "CE4.1.3: Affine Motion Compensation Prediction," Joint Video Exploration Team (JVET) of ITU-T SG 16 WP 3 and ISO/IEC JTC 1/SC 29/WG 11, 11th meeting, Ljubljana, SI, Jul. 10-18, 2018, document JVET-K0337, 2018.

He et al. "CE4-Related: Adaptive Precision for Affine MVD Coding," Joint Video Experts Team (JVET) of ITU-T SG 16 WP 3 and ISO/IEC JTC 1/SC 29/WG 11, 12th Meeting, Macao, CN Oct. 3-12, 2018, document JVET-L0259 2018.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Huang et al. "CE4.2.5: Simplification of Affine Merge List Construction and Move ATMVP to Affine Merge List," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0278, 2018.

Li et al. "An Efficient Four-Parameter Affine Motion Model for Video Coding," IEEE Transactions on Circuits and Systems for Video Technology, Aug. 31, 2018, 28(8):1934-1948.

Li et al. "A Motion Aided Merge Mode for HEVC," ICASSP, IEEE, Dec. 31, 2018, pp. 1773-1776.

Li et al. "CE4-Related: Affine Merge Mode with Prediction Offsets," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0320, 2018.

Li et al. "CE2: Affine Merge with Prediction Offset (Test CE2.2.4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0431, 2019.

Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.

Jeong et al. "Proposed WD for CE4 Ultimate Motion Vector Expression (Test 4.5.4)," Joint Video Experts Team (JVET) of

(56) References Cited

OTHER PUBLICATIONS

ITU-T SG 16 WP 3 and ISO/IEC JTC 1/SC 29/WG 11, 12th Meeting, Macao, CN, Oct. 3-12, 2018, document JVET-L0054_WD, 2018.

Su et al. "CE4.4.1: Generalized Bi-Prediction for Intercoding," Joint Video Exploration Team of ISO/IEC JTC 1/SC 29/ WG 11 and ITU-T SG 16, Ljubljana, Jul. 10-18, 2018, document No. JVET-K0248, 2018.

Xu et al. "CE8-2.2: Current Picture Referencing Using Reference Index Signaling," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0076, 2018.

Yan et al. "Diagonal Motion Partitions for Inter Prediction in HEVC," VCIP, IEEE, Nov. 30, 2016, Chengdu China.

Zhou et al. "Non-CE4: A Study on the Affine Merge Mode," Joint Video Experts Team (JVET) of ITU-T SG 16 WP 3 and ISO/IEC JTC 1/CS 29/WG 11, 11th Meeting, Ljubljana, SI, Jul. 10-18, 2018, document JVET-K0052, 2018.

JEM-7.0: https://jvet.hhi.fraunhofer.de/svn/svn_HMJEMSoftware/tags/ HM-16.6-JEM-7.0.

https://vcgit.hhi.fraunhofer.de/jvet/VVCSoftware_VTM/-/tags/VTM-2.1.

International Search Report and Written Opinion from International Patent Application No. PCT/CN2019/130712 dated Apr. 1, 2020 (9 pages).

International Search Report and Written Opinion from International Patent Application No. PCT/CN2019/130723 dated Apr. 3, 2020 (10 pages).

International Search Report and Written Opinion from International Patent Application No. PCT/CN2019/130725 dated Mar. 27, 2020 (10 pages).

International Search Report and Written Opinion from International Patent Application No. PCT/CN2020/070772 dated Apr. 10, 2020 (10 pages).

International Search Report and Written Opinion from International Patent Application No. PCT/CN2020/071440 dated Apr. 9, 2020 (10 pages).

International Search Report and Written Opinion from International Patent Application No. PCT/CN2020/071444 dated Mar. 26, 2020 (11 pages).

Non-Final Office Action from U.S. Appl. No. 17/373,010 dated Aug. 4, 2023.

Lin et al. CE4.2.3: "Affine Merge Mode," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0088, 2018.

\* cited by examiner

AFFINE BASED MERGE WITH MVD

CROSS REFERENCE TO RELATED APPLICATIONS

This application is a continuation of International Patent Application No. PCT/CN2020/071440, filed on Jan. 10, 2020, which claims the priority to and benefits of International Patent Application PCT/CN2019/071159, filed on Jan. 10, 2019. All of the aforementioned patent applications are hereby incorporated by reference in their entireties.

TECHNICAL FIELD

The present document relates to video and image coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses video coding tools that, in one example aspect, improve the signaling of motion vectors for video and image coding.

In one aspect, there is disclosed a method for video processing, comprising: determining for a current video block, an indication which indicates that an affine merge with motion vector difference (MMVD) mode is applied to the current video block;
performing a conversion between the current video block and a bitstream representation of a current video block based on the indication, wherein the indication is activated based on the usage of at least one merge list for the current video block.

In another aspect, there is disclosed a method for video processing, comprising: performing a conversion between a current video block and a bitstream representation of the current video block, wherein the current video block is converted with a sub-block based non-affine mode; wherein the conversion comprises applying MMVD mode to each of sub-blocks split from the current video block based on an indication indicating that the MMVD is enabled.

In yet another aspect, there is disclosed a method for video processing, comprising: determining MMVD side information for a current video block from adaptive motion vector resolution (AMVR) information; and performing a conversion between a current video block and a bitstream representation of the current video block based on the MMVD side information, wherein the MMVD side information for an affine MMVD mode and that for a non-affine MMVD mode are signaled in different sets of AMVR information.

In still another aspect, there is disclosed a method for video processing, comprising: determining MVD information for a current video block converted in MMVD mode; performing a conversion between a current video block and a bitstream representation of the current video block based on the MVD information, wherein the MVD information for a sub-block merge candidate is signaled in a same way as that for a regular merge candidate.

In another aspect, there is disclosed a method for video processing, comprising: determining for a current video block, an indication which indicates that an affine merge with motion vector difference (MMVD) mode is applied to the current video block;
performing a conversion between the current video block and a bitstream representation of a current video block based on the indication, wherein the indication is activated in response to multiple conditions being satisfied, wherein the multiple conditions at least comprises: at least one merge list used for the affine merge with MMVD mode being independent from a non-affine merge list and an affine mode being enabled.

In yet another aspect, there is disclosed a method for video processing, comprising: determining MVD side information for a current video block converted in a sub-block based MMVD mode; performing a conversion between a current video block and a bitstream representation of the current video block based on the MVD side information, wherein the MVD side information depends on at least one of a coding mode for the current video block, color component to be processed and a color format of the color component.

In an aspect, there is disclosed an apparatus in a video system, the apparatus comprising a processor and a non-transitory memory with instructions thereon, wherein the instructions upon execution by the processor, cause the processor to implement the method in any one of examples described as above In an aspect, there is disclosed a computer program product stored on a non-transitory computer readable media, the computer program product including program code for carrying out the method in any one of examples described as above In yet another example aspect, the above-described method may be implemented by a video encoder apparatus or a video decoder apparatus that comprises a processor.

In yet another example aspect, these methods may be embodied in the form of processor-executable instructions and stored on a computer-readable program medium.

These, and other, aspects are further described in the present document.

DETAILED DESCRIPTION

The present document provides various techniques that can be used by a decoder of video bitstreams to improve the quality of decompressed or decoded digital video. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This patent document is related to video coding technologies. Specifically, it is related to motion compensation in video coding. It may be applied to the existing video coding standard like HEVC, or the standard (Versatile Video Coding) to be finalized. It may be also applicable to future video coding standards or video codec.

2. Introductory Comments

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Affine Motion Compensation Prediction

Figure 1:
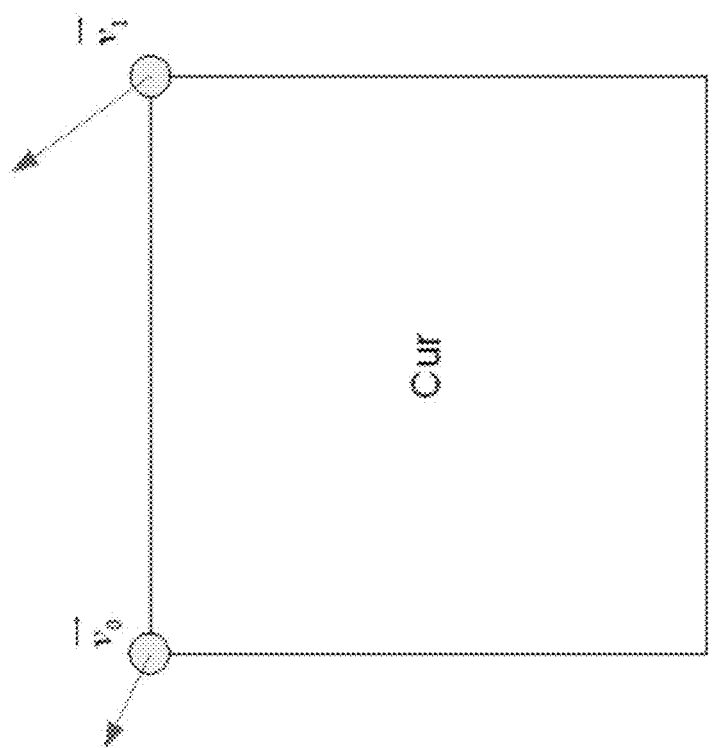
FIG. 1 shows an example of simplified affine motion model.

In HEVC, only translation motion model is applied for motion compensation prediction (MCP). While in the real world, there are many kinds of motion, e.g. zoom in/out, rotation, perspective motions and the other irregular motions. In the JEM, a simplified affine transform motion compensation prediction is applied. As shown FIG. 1, the affine motion field of the block is described by two control point motion vectors.

The motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (1)$$

Where $(v_{0x}, v_{0y})$ is motion vector of the top-left corner control point, and $(v_{1x}, v_{1y})$ is motion vector of the top-right corner control point.

In order to further simplify the motion compensation prediction, sub-block based affine transform prediction is applied. The sub-block size M×N is derived as in Equation 2, where MvPre is the motion vector fraction accuracy (1/16 in JEM), $(v_{2x}, v_{2y})$ is motion vector of the bottom-left control point, calculated according to Equation 1.

$$\begin{cases} M = clip\,3\left(4, w, \frac{w \times MvPre}{max(abs(v_{1x} - v_{0x}), abs(v_{1y} - v_{0y}))}\right) \\ N = clip\,3\left(4, h, \frac{h \times MvPre}{max(abs(v_{2x} - v_{0x}), abs(v_{2y} - v_{0y}))}\right) \end{cases} \quad (2)$$

After derived by Equation 2, M and N should be adjusted downward if necessary to make it a divisor of w and h, respectively.

Figure 2:
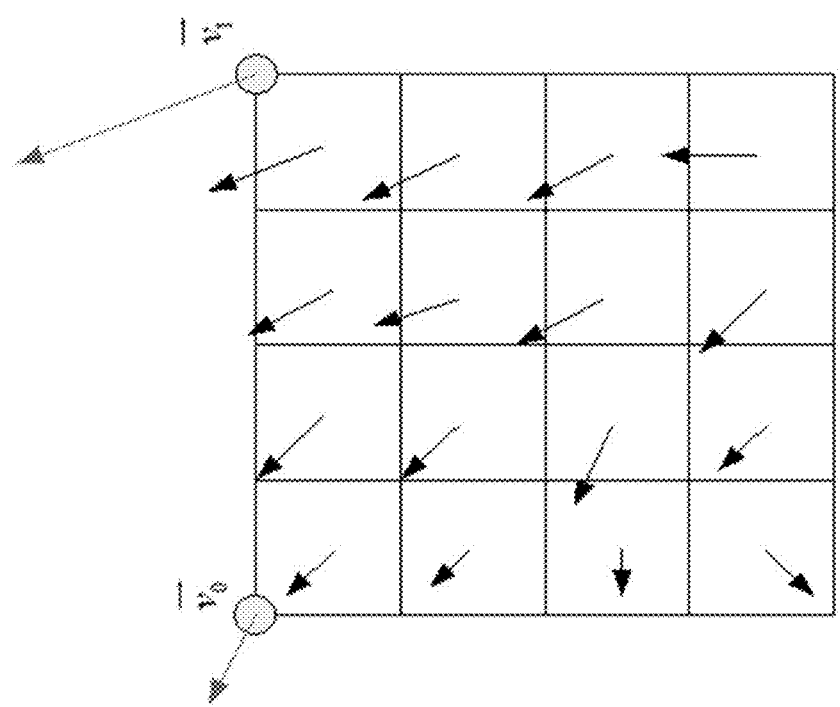
FIG. 2 shows an example of affine motion vector field (MVF) per sub-block.

To derive motion vector of each M×N sub-block, the motion vector of the center sample of each sub-block, as shown in FIG. 2, is calculated according to Equation 1, and rounded to 1/16 fraction accuracy.

After MCP, the high accuracy motion vector of each sub-block is rounded and saved as the same accuracy as the normal motion vector.

2.1.1 AF_INTER Mode

Figure 4:
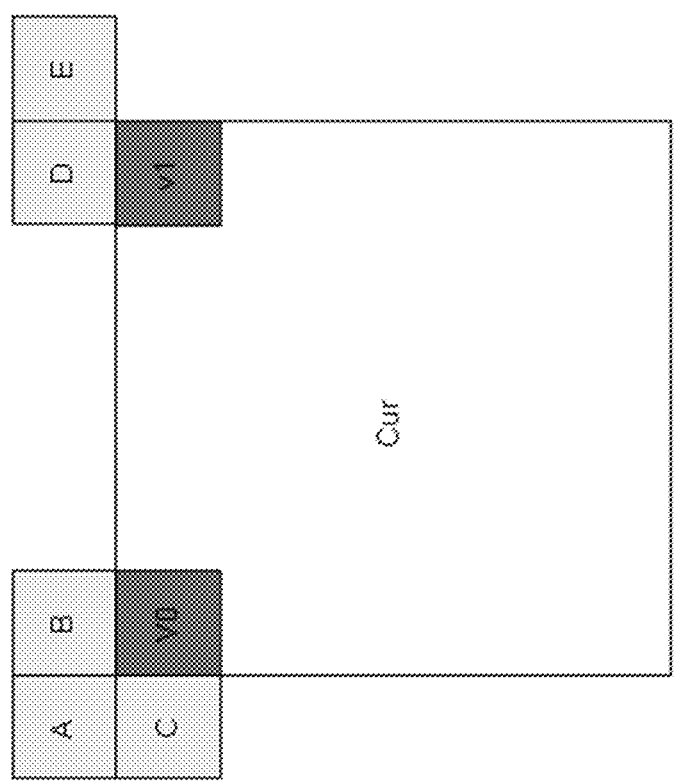
FIG. 4 shows an example of motion vector predictor (MVP) for AF_INTER.

In the JEM, there are two affine motion modes: AF_INTER mode and AF_MERGE mode. For CUs with both width and height larger than 8, AF_INTER mode can be applied. An affine flag in CU level is signaled in the bitstream to indicate whether AF_INTER mode is used. In this mode, a candidate list with motion vector pair $\{(v_0, v_1)|v_0=\{v_A, v_B, v_C\}, v_1=\{v_D,v_E\}\}$ is constructed using the neighbour blocks. As shown in FIG. 4, $v_0$ is selected from the motion vectors of the block A, B or C. The motion vector from the neighbour block is scaled according to the reference list and the relationship among the POC of the reference for the neighbour block, the POC of the reference for the current CU and the POC of the current CU. And the approach to select $v_1$ from the neighbour block D and E is similar. If the number of candidate list is smaller than 2, the list is padded by the motion vector pair composed by duplicating each of the AMVP candidates. When the candidate list is larger than 2, the candidates are firstly sorted according to the consistency of the neighbouring motion vectors (similarity of the two motion vectors in a pair candidate) and only the first two candidates are kept. An RD cost check is used to determine which motion vector pair candidate is selected as the control point motion vector prediction (CPMVP) of the current CU. And an index indicating the position of the CPMVP in the candidate list is signaled in the bitstream. After the CPMVP of the current affine CU is determined, affine motion estimation is applied and the control point motion vector (CPMV) is found. Then the difference of the CPMV and the CPMVP is signaled in the bitstream.

Figure 3B:
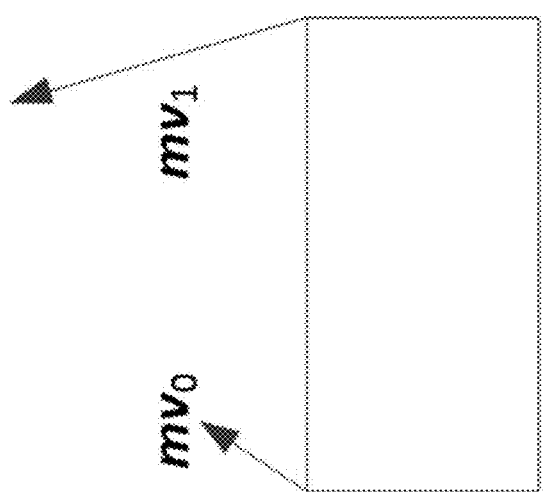
FIG. 3A-3B show 4 and 6 parameter affine models, respectively.
Figure 3A:
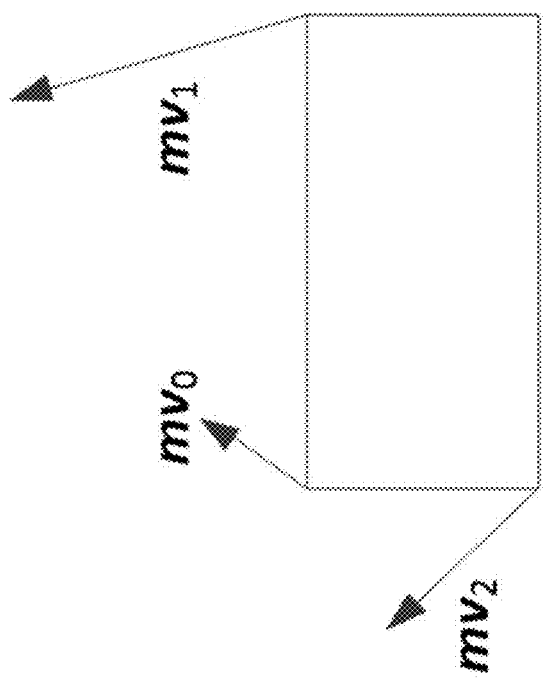

FIG. 3A shows an example of a 4-parameter affine model. FIG. 3B shows an example of a 6-parameter affine model.

In AF_INTER mode, when 4/6 parameter affine mode is used, 2/3 control points are required, and therefore 2/3 MVD needs to be coded for these control points, as shown in FIG. 3A. In an example, it is proposed to derive the MV as follows, e.g., $mvd_1$ and $mvd_2$ are predicted from $mvd_0$.

$mv_0=\overline{mv}_0+mvd_0$ $mv_1=\overline{mv}_1+mvd_1+mvd_0$ $mv_2=\overline{mv}_2+mvd_2+mvd_0$ Wherein $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 3B. Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.1.2 Fast Affine ME Algorithm in AF_INTER Mode

In affine mode, MV of 2 or 3 control points needs to be determined jointly. Directly searching the multiple MVs jointly is computationally complex. A fast affine ME algorithm is proposed and is adopted into VTM/BMS.

The fast affine ME algorithm is described for the 4-parameter affine model, and the idea can be extended to 6-parameter affine model.

$$\begin{cases} x' = ax + by + c \\ y' = -bx + ay + d \end{cases} \quad (3)$$

$$\begin{cases} mv^h_{(x,y)} = x' - x = (a-1)x + by + c \\ mv^v_{(x,y)} = y' - y = -bx + (a-1)y + d \end{cases} \quad (4)$$

Replace (a−1) with a', then the motion vector can be rewritten as:

$$\begin{cases} mv^h_{(x,y)} = x' - x = a'x + by + c \\ mv^v_{(x,y)} = y' - y = -bx + a'y + d \end{cases} \quad (5)$$

Suppose motion vectors of the two controls points (0, 0) and (0, w) are known, from Equation (5) we can derive affine parameters, $$\begin{cases} c = mv^h_{(0,0)} \\ d = mv^v_{(0,0)} \end{cases} \quad (6)$$

The motion vectors can be rewritten in vector form as:

$$MV(p) = A(P) * MV_C^T \quad (7)$$

Wherein $$A(P) = \begin{bmatrix} 1 & x & 0 & y \\ 0 & y & 1 & -x \end{bmatrix} \quad (8)$$

$$MV_c = [mv^h_{(0,0)} \, a \, mv^v_{(0,0)} \, b] \quad (9)$$

P=(x, y) is the pixel position.

At encoder, MVD of AF_INTER are derived iteratively. Denote $MV^i(P)$ as the MV derived in the ith iteration for position P and denote $dMV_C^i$ as the delta updated for $MV_C$ in the ith iteration. Then in the (i+1)th iteration, $$\begin{aligned} MV^{i+1}(P) &= A(P) * ((MV_c^i)^T + (dMV_c^i)^T) \\ &= A(P) * (MV_c^i)^T + A(P) * (dMV_c^i)^T \\ &= MV^i(P) + A(P) * (dMV_c^i)^T \end{aligned} \quad (10)$$

Denote $Pic_{ref}$ as the reference picture and denote $PiC_{cur}$ as the current picture and denote $Q=P+MV^i(P)$. Suppose we use MSE as the matching criterion, then we need to minimize:

$$\min \sum_P (Pic_{cur}(P) - Pic_{ref}(P + MV^{i+1}(P)))^2 = \quad (11)$$

$$\min \sum_P (Pic_{cur}(P) - Pic_{ref}(Q + A(P) * (dMV_c^i)^T))^2$$

Suppose $(dMV_C^i)^T$ is small enough, we can rewrite $Pic_{ref}$ $(Q+A(P)*(dMV_C^i)^T)$ approximately as follows with 1th order Taylor expansion.

$$Pic_{ref}(Q+A(P)*(dMV_C^i)^T) \approx Pic_{ref}(Q) + Pic_{ref}'(Q)*A(P)* (dMV_C^i)^T \quad (12)$$

Wherein $$Pic'_{ref}(Q) = \left[ \frac{dPic_{ref}(Q)}{dx} \, \frac{dPic_{ref}(Q)}{dy} \right].$$

Denote $E^{i+1}(P) = Pic_{Cur}(P) - Pic_{ref}(Q)$, $$\min \Sigma_P (Pic_{Cur}(P) - Pic_{ref}(Q) - Pic_{ref}'(Q)*A(P)* (dMV)^T)^2 = \min \Sigma_P (E^{i+1}(P) - Pic_{ref}'(Q)*A(P)* (dMV_C^i)^T)^2 \quad (13)$$

we can derive $dMV_C^i$ by setting the derivative of the error function to zero. Then can then calculate delta MV of the control points (0, 0) and (0, w) according to $A(P)*(dMV_C^i)^T$, $$dMV_{(0,0)}^h = dMV_C^i[0] \quad (14)$$

$$dMV_{(0,w)}^h = dMV_C^i[1]*w + dMV_C^i[2] \quad (15)$$

$$dMV_{(0,0)}^v = dMV_C^i[2] \quad (16)$$

$$dMV_{(0,w)}^v = -dMV_C^i[3]*w + dMV_C^i[2] \quad (17)$$

Suppose such MVD derivation process is iterated by n times, then the final MVD is calculated as follows, $$fdMV_{(0,0)}^v = \Sigma_{i=0}^{n-1} dMV_C^i[0] \quad (18)$$

$$fdMV_{(0,w)}^h = \Sigma_{i=0}^{n-1} dMV_C^i[1]*w + dMV_C^i[0] \quad (19)$$

$$fdMV_{(0,0)}^v = \Sigma_{i=0}^{n-1} dMV_C^i[2] \quad (20)$$

$$fdMV_{(0,w)}^v = \Sigma_{i=0}^{n-1} dMV_C^i[3]*w + dMV_C^i[2] \quad (21)$$

As an example, e.g., predicting delta MV of control point (0, w), denoted by $mvd_1$ from delta MV of control point (0, 0), denoted by $mvd_0$, now actually only $(\Sigma_{i=0}^{n-1} dMV_C^i[1]* w, -\Sigma_{i=0}^{n-1} dMV_C^i[3]*w)$ is encoded for $mvd_1$.

2.1.3 AF_MERGE Mode

Figures 5A, 5B:
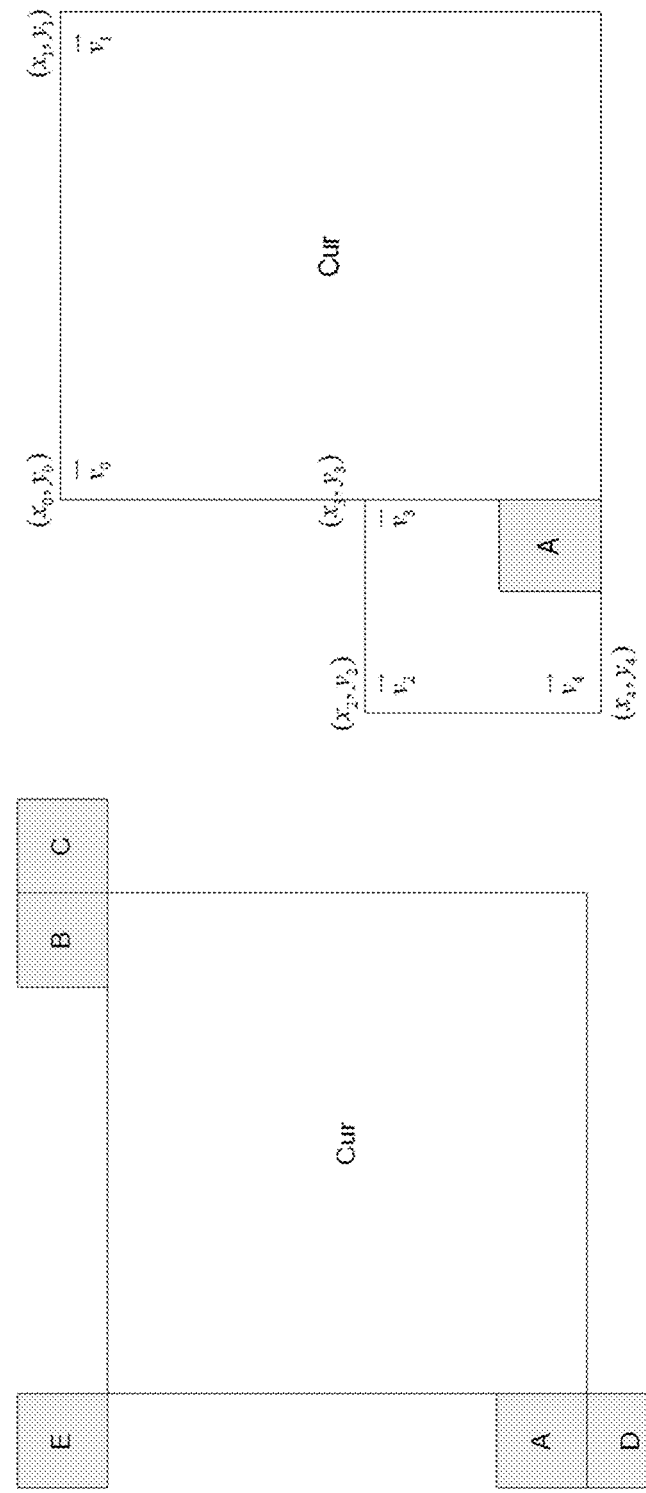
FIG. 5A-5B show examples of candidates for AF_MERGE.

When a CU is applied in AF_MERGE mode, it gets the first block coded with affine mode from the valid neighbour reconstructed blocks. And the selection order for the candidate block is from left, above, above right, left bottom to above left as shown in FIG. 5A. If the neighbour left bottom block A is coded in affine mode as shown in FIG. 5B, the motion vectors $v_2$, $v_3$ and $v_4$ of the top left corner, above right corner and left bottom corner of the CU which contains the block A are derived. And the motion vector $v_0$ of the top left corner on the current CU is calculated according to $v_2$, $v_3$ and $v_4$. Secondly, the motion vector $v_1$ of the above right of the current CU is calculated.

After the CPMV of the current CU $v_0$ and $v_1$ are derived, according to the simplified affine motion model Equation 1, the MVF of the current CU is generated. In order to identify whether the current CU is coded with AF_MERGE mode, an affine flag is signaled in the bitstream when there is at least one neighbour block is coded in affine mode.

In an example, which was planned to be adopted into VTM 3.0, an affine merge candidate list is constructed with following steps:

1) Insert Inherited Affine Candidates

Figure 6:
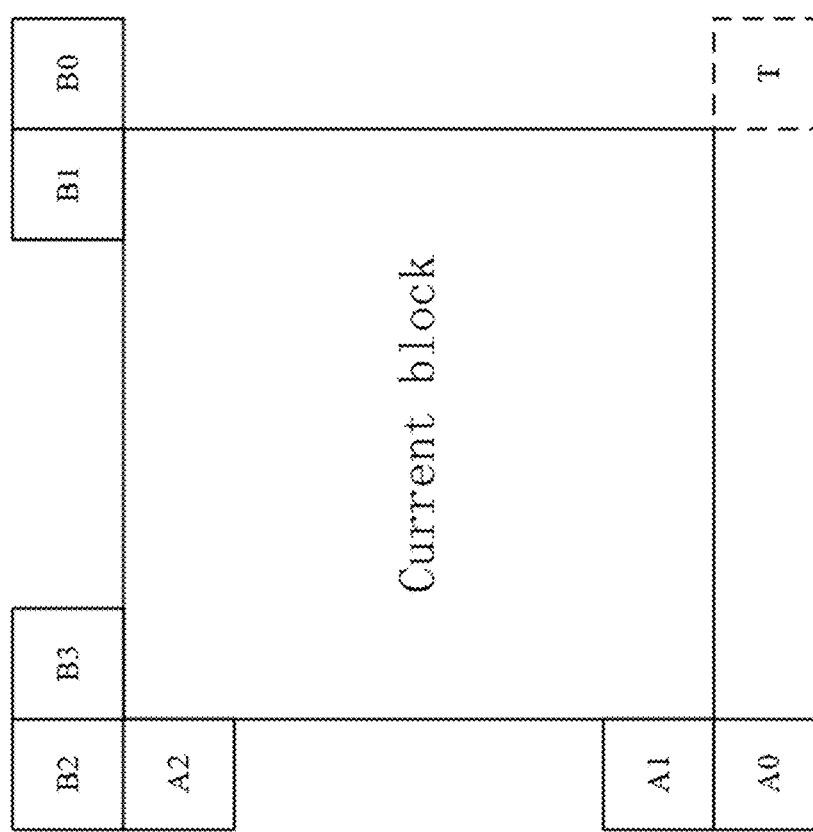
FIG. 6 shows an example of candidate positions for affine merge mode.

Inherited affine candidate means that the candidate is derived from the affine motion model of its valid neighbor affine coded block. In the common base, as shown in FIG. 6, the scan order for the candidate positions is: A1, B1, B0, A0 and B2.

After a candidate is derived, full pruning process is performed to check whether same candidate has been inserted into the list. If a same candidate exists, the derived candidate is discarded.

2) Insert Constructed Affine Candidates

If the number of candidates in affine merge candidate list is less than MaxNumAffineCand (set to 5 in this contribution), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 5B. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

FIG. 6 shows an example of candidates position for affine merge mode

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.

For CP3, the checking priority is A1→A0.

For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.

The combinations of constructed affine candidates are inserted into to candidate list as following order:
{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived Candidate is Discarded.

3) Padding with Zero Motion Vectors

If the number of candidates in affine merge candidate list is less than 5, zero motion vectors with zero reference indices are insert into the candidate list, until the list is full.

2.2 Affine Merge Mode with Prediction Offsets

In an example, UMVE is extended to affine merge mode, we will call this UMVE affine mode thereafter. The proposed method selects the first available affine merge candidate as a base predictor. Then it applies a motion vector offset to each control point's motion vector value from the base predictor. If there's no affine merge candidate available, this proposed method will not be used.

The selected base predictor's inter prediction direction, and the reference index of each direction is used without change.

In the current implementation, the current block's affine model is assumed to be a 4-parameter model, only 2 control points need to be derived. Thus, only the first 2 control points of the base predictor will be used as control point predictors.

For each control point, a zero_MVD flag is used to indicate whether the control point of current block has the same MV value as the corresponding control point predictor. If zero_MVD flag is true, there's no other signaling needed for the control point. Otherwise, a distance index and an offset direction index is signaled for the control point.

Figure 7:
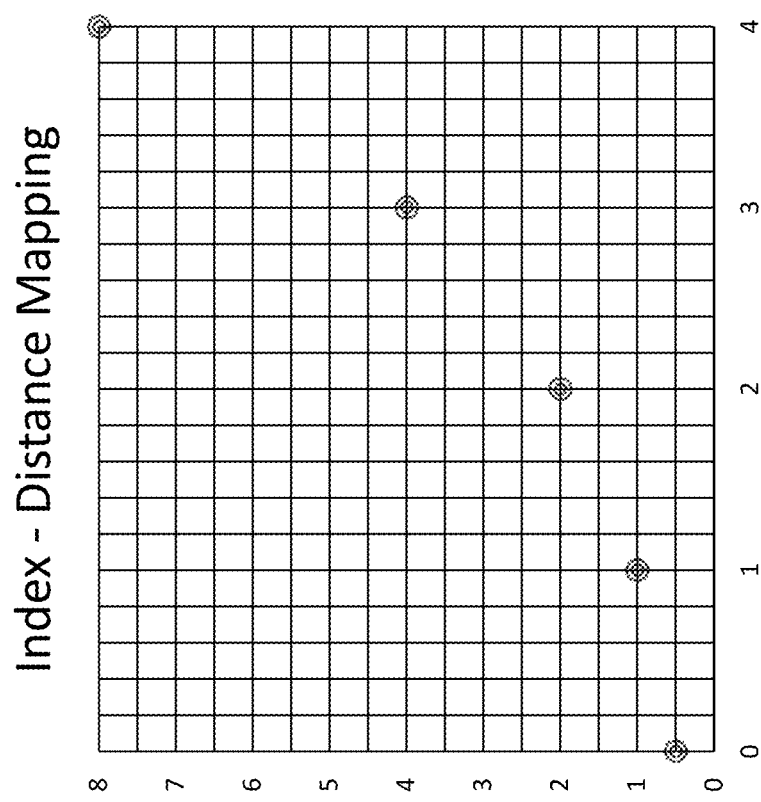
FIG. 7 shows an example of distance index and distance offset mapping.

A distance offset table with size of 5 is used as shown in the table below. Distance index is signaled to indicate which distance offset to use. The mapping of distance index and distance offset values is shown in FIG. 7.

TABLE

| Distance offset table | | | | | |
| --- | --- | --- | --- | --- | --- |
| Distance IDX | 0 | 1 | 2 | 3 | 4 |
| Distance-offset | 1/2-pel | 1-pel | 2-pel | 4-pel | 8-pel |

The direction index can represent four directions as shown below, where only x or y direction may have an MV difference, but not in both directions.

| Offset Direction IDX | 00 | 01 | 10 | 11 |
| --- | --- | --- | --- | --- |
| x-dir-factor | +1 | −1 | 0 | 0 |
| y-dir-factor | 0 | 0 | +1 | −1 |

If the inter prediction is uni-directional, the signaled distance offset is applied on the offset direction for each control point predictor. Results will be the MV value of each control point.

For example, when base predictor is uni-directional, and the motion vector values of a control point is MVP ($v_{px}$, $v_{py}$). When distance offset and direction index are signaled, the motion vectors of current block's corresponding control points will be calculated as below.

$$MV(v_x, v_y) = MVP(v_{px}, v_{py}) + MV(x\text{-dir-factor}*\text{distance-offset}, y\text{-dir-factor}*\text{distance-offset});$$

If the inter prediction is bi-directional, the signaled distance offset is applied on the signaled offset direction for control point predictor's L0 motion vector; and the same distance offset with opposite direction is applied for control point predictor's L1 motion vector. Results will be the MV values of each control point, on each inter prediction direction.

For example, when base predictor is uni-directional, and the motion vector values of a control point on L0 is $MVP_{L0}(v_{0px}, v_{0py})$, and the motion vector of that control point on L1 is $MVP_{L1}(v_{1px}, v_{1py})$. When distance offset and direction index are signaled, the motion vectors of current block's corresponding control points will be calculated as below.

$MV_{L0}(v_{0x}, v_{0y}) = MVP_{L0}(v_{0px}, v_{0py}) + MV(x\text{-dir-factor}*\text{distance-offset}, y\text{-dir-factor}*\text{distance-offset})$;

$MV_{L1}(v_{0x}, v_{0y}) = MVP_{L1}(v_{0px}, v_{0py}) + MV(-x\text{-dir-factor}*\text{distance-offset}, -y\text{-dir-factor}*\text{distance-offset})$;

2.3 Ultimate Motion Vector Expression

In an example, ultimate motion vector expression (UMVE) is presented. UMVE is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

Figure 8:
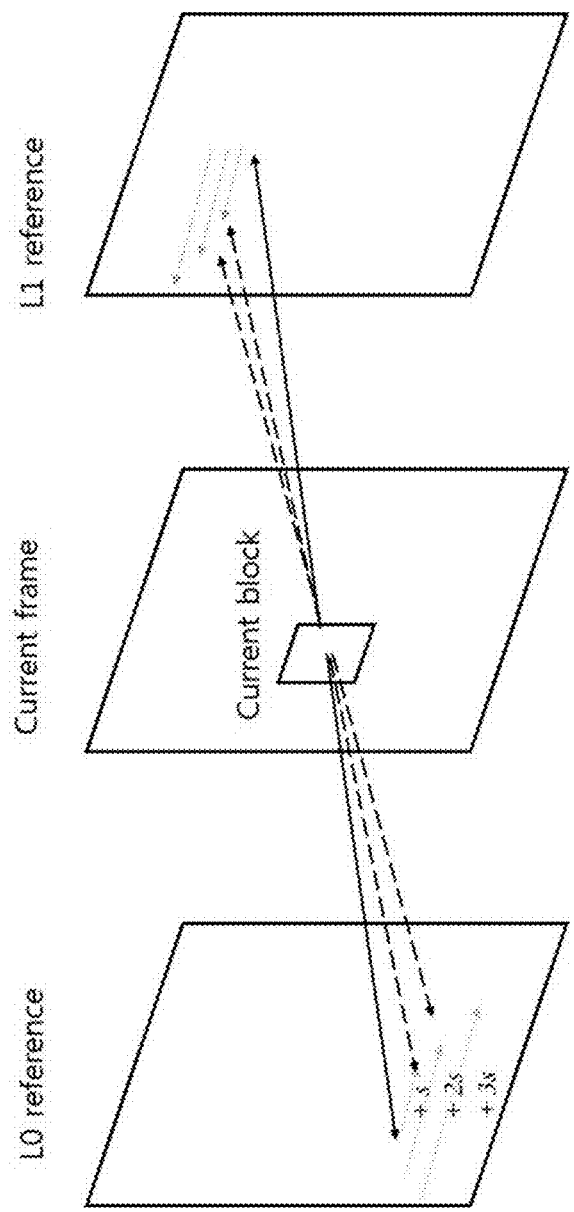
FIG. 8 shows an example of ultimate motion vector expression (UMVE) search process.

FIG. 8 shows an example of UMVE Search Process.

Figure 9:
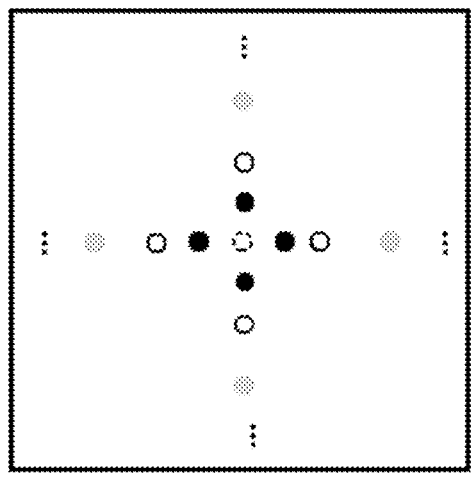
FIG. 9 shows an example of UMVE search point.
Figure 9:
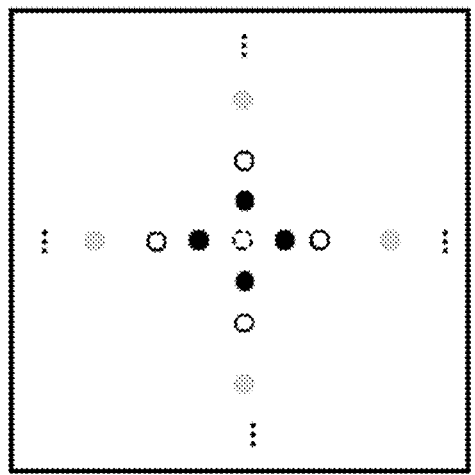

FIG. 9 shows examples of UMVE Search Points.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 2a

| Distance IDX | | | | | | | | |
|---|---|---|---|---|---|---|---|---|
| Distance IDX | 0 | 1 | 2 | 3 | 4 | 5 | 6 | 7 |
| Pixel distance | 1/4-pel | 1/2-pel | 1-pel | 2-pel | 4-pel | 8-pel | 16-pel | 32-pel |

The distance IDX is binarized in bins with the truncated unary code in the entropy coding procedure as:

TABLE 2b

| Distance IDX Binarization | | | | | | | | |
|---|---|---|---|---|---|---|---|---|
| Distance IDX | 0 | 1 | 2 | 3 | 4 | 5 | 6 | 7 |
| Bins | 0 | 10 | 110 | 1110 | 11110 | 111110 | 1111110 | 1111111 |

In arithmetic coding, the first bin is coded with a probability context, and the following bins are coded with the equal-probability model, a.k.a. by-pass coding.

Direction index represents the direction of the MVD relative to the starting point. The direction index can represent of the four directions as shown below.

TABLE 3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

UMVE flag is signaled right after sending a skip flag or merge flag. If skip or merge flag is true, UMVE flag is parsed. If UMVE flage is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

UMVE is known as Merge with MVD (MMVD).

2.4 Generalized Bi-Prediction

In conventional bi-prediction, the predictors from L0 and L1 are averaged to generate the final predictor using the equal weight 0.5. The predictor generation formula is shown as in Equ. (3)

$$P_{TraditionalBiPred} = (P_{L0} + P_{L1} + \text{RoundingOffset}) >> \text{shiftNum}, \quad (1)$$

In Equ. (3), $P_{TraditionalBiPred}$ is the final predictor for the conventional bi-prediction, $P_{L0}$ and $P_{L1}$ are predictors from L0 and L1, respectively, and RoundingOffset and shiftNum are used to normalize the final predictor.

Generalized Bi-prediction (GBI) is proposed to allow applying different weights to predictors from L0 and L1. The predictor generation is shown in Equ. (4).

$$P_{GBi} = ((1-w_1)*P_{L0} + w_1*P_{L1} + \text{RoundingOffset}_{GBi}) >> \text{shiftNum}_{GBi}, \quad (2)$$

In Equ. (4), $P_{GBi}$ is the final predictor of GBi. $(1-w_1)$ and $w_1$ are the selected GBI weights applied to the predictors of L0 and L1, respectively. RoundingOffset$_{GBi}$ and shift-Num$_{GBi}$ are used to normalize the final predictor in GBi.

The supported weights of $w_1$ is $\{-1/4, 3/8, 1/2, 5/8, 5/4\}$. One equal-weight set and four unequal-weight sets are supported. For the equal-weight case, the process to generate the final predictor is exactly the same as that in the conventional bi-prediction mode. For the true bi-prediction cases in random access (RA) condition, the number of candidate weight sets is reduced to three.

For advanced motion vector prediction (AMVP) mode, the weight selection in GBI is explicitly signaled at CU-level if this CU is coded by bi-prediction. For merge mode, the weight selection is inherited from the merge candidate. In this proposal, GBI supports DMVR to generate the weighted average of template as well as the final predictor for BMS-1.0.

2.5 Adaptive Motion Vector Difference Resolution

In HEVC, motion vector differences (MVDs) (between the motion vector and predicted motion vector of a PU) are signaled in units of quarter luma samples when use_integer_mv_flag is equal to 0 in the slice header. In VTM-3.0, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signaled for each CU that has at least one non-zero MVD components.

For a CU that has at least one non-zero MVD components, a first flag is signaled to indicate whether quarter luma sample MV precision is used in the CU. When the first flag (equal to 1) indicates that quarter luma sample MV precision is not used, another flag is signaled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In arithmetic coding, the first MVD resolution flag is coded with one of three probability contexts: C0, C1 or C2; while the second MVD resolution flag is coded with a forth probability context: C3. The probability context Cx for the first MVD resolution flag is derived as (L represents the left neighbouring block and A represents the above neighbouring block):

If L is available, inter-coded, and its first MVD resolution flag is not equal to zero, xL is set equal to 1; otherwise, xL is set equal to 0.

If A is available, inter-coded, and its first MVD resolution flag is not equal to zero, xA is set equal to 1; otherwise, xA is set equal to 0.

x is set equal to xL+xA.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

In VTM-3.0, LAMVR is also known as Integer Motion Vector (IMV).

2.6 Current Picture Referencing

Decoder Aspect:

In this approach, the current (partially) decoded picture is considered as a reference picture. This current picture is put in the last position of reference picture list 0. Therefore, for a slice using the current picture as the only reference picture, its slice type is considered as a P slice. The bitstream syntax in this approach follows the same syntax structure for inter coding while the decoding process is unified with inter coding. The only outstanding difference is that the block vector (which is the motion vector pointing to the current picture) always uses integer-pel resolution.

Changes from block level CPR_flag approach are:

In encoder search for this mode, both block width and height are smaller than or equal to 16.

Enable chroma interpolation when luma block vector is an odd integer number.

Enable adaptive motion vector resolution (AMVR) for CPR mode when the SPS flag is on. In this case, when AMVR is used, a block vector can switch between 1-pel integer and 4-pel integer resolutions at block level.

Encoder Aspect:

The encoder performs RD check for blocks with either width or height no larger than 16. For non-merge mode, the block vector search is performed using hash-based search first. If there is no valid candidate found from hash search, block matching based local search will be performed.

In the hash-based search, hash key matching (32-bit CRC) between the current block and a reference block is extended to all allowed block sizes. The hash key calculation for every position in current picture is based on 4×4 blocks. For the current block of a larger size, a hash key matching to a reference block happens when all its 4×4 blocks match the hash keys in the corresponding reference locations. If multiple reference blocks are found to match the current block with the same hash key, the block vector costs of each candidates are calculated and the one with minimum cost is selected.

In block matching search, the search range is set to be 64 pixels to the left and on top of current block, and the search range is restricted to be within the current CTU.

2.7 Merge List Design in One Example

There are three different merge list construction processes supported in VVC:

1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.

2) Uni-Prediction TPM merge list: For triangular prediction mode, one merge list construction process for the two partitions is shared even two partitions could select their own merge candidate index. When constructing this merge list, the spatial neighbouring blocks and two temporal blocks of the block are checked. The motion information derived from spatial neighbours and temporal blocks are called regular motion candidates in our IDF. These regular motion candidates are further utilized to derive multiple TPM candidates. Please note the transform is performed in the whole block level, even two partitions may use different motion vectors for generating their own prediction blocks.

In some embodiments, uni-Prediction TPM merge list size is fixed to be 5.

3) Regular merge list: For remaining coding blocks, one merge list construction process is shared. Here, the spatial/temporal/HMVP, pairwise combined bi-prediction merge candidates and zero motion candidates may be inserted in order. Regular merge list size is signaled in slice header, and maximum value is 6.

Sub-Block Merge Candidate List

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes affine merge candidates, and ATMVP candidate, and/or sub-block based STMVP candidate.

In this contribution, the ATMVP merge candidate in the normal merge list is moved to the first position of the affine merge list. Such that all the merge candidates in the new list (i.e., sub-block based merge candidate list) are based on sub-block coding tools.

An affine merge candidate list is constructed with following steps:

1) Insert Inherited Affine Candidates

Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B2}.

2) Insert Constructed Affine Candidates

If the number of candidates in affine merge candidate list is less than MaxNumAffineCand (set to 5), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 7. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.
For CP3, the checking priority is A1→A0.
For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the two combinations ({CP1, CP2}, {CP1, CP3}). The two combinations will be converted to a 4-parameter motion model represented by top-left and top-right control points.

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}

The available combination of motion information of CPs is only added to the affine merge list when the CPs have the same reference index.

3) Padding with Zero Motion Vectors

If the number of candidates in affine merge candidate list is less than 5, zero motion vectors with zero reference indices are insert into the candidate list, until the list is full.

2.8 MMVD with Affine Merge Candidate in an Example

For example the MMVD idea is applied on affine merge candidates (named as Affine merge with prediction offset). It is an extension of A MVD (or named as "distance", or "offset") is signaled after an affine merge candidate (known as the is signaled. The all CPMVs are added with the MVD to get the new CPMVs. The distance table is specified as

| Distance IDX | 0 | 1 | 2 | 3 | 4 |
| --- | --- | --- | --- | --- | --- |
| Distance-offset | 1/2-pel | 1-pel | 2-pel | 4-pel | 8-pel |

In some embodiments, a POC distance based offset mirroring method is used for Bi-prediction. When the base candidate is bi-predicted, the offset applied to L0 is as signaled, and the offset on L1 depends on the temporal position of the reference pictures on list 0 and list 1.

If both reference pictures are on the same temporal side of the current picture, the same distance offset and same offset directions are applied for CPMVs of both L0 and L1.

When the two reference pictures are on different sides of the current picture, the CPMVs of L1 will have the distance offset applied on the opposite offset direction.

3. Examples of Problems Solved by the Disclosed Embodiments

There are some potential problems in the design of MMVD:

The coding/parsing procedure for UMVE information may be not efficient since it uses truncated unary binarization method for coding distance (MVD precision) information and fixed length with bypass coding for direction index. That is based on the assumption that the ¼-pel precision takes the highest percentage. However, it is not true for all kinds of sequences.

The design of the possible distances may be not efficient.

4. Examples of Techniques Implemented by Various Embodiments

The list below should be considered as examples to explain general concepts. These inventions should not be interpreted in a narrow way. Furthermore, these techniques can be combined in any manner.

Parsing on Distance Index (e.g., MVD Precision Index)
1. It is proposed that the distance index (DI) used in UMVE is not binarized with the truncated unary code.
   a. In one example, DI may be binarized with fixed-length code, Exponential-Golomb code, truncated Exponential-Golomb code, Rice code, or any other codes.
2. The distance index may be signaled with more than one syntax elements.
3. It is proposed to classify the set of allowed distances to multiple sub-sets, e.g., K sub-sets (K is larger than 1). A sub-set index ($1^{st}$ syntax) is firstly signaled, followed by distance index ($2^{nd}$ syntax) within the sub-set.
   a. For example, mmvd_distance_subset_idx is first signaled, followed by mmvd_distance_idx_in_subset.
      i. In one example, the mmvd_distance_idx_in_subset can be binarized with unary code, truncated unary code, fixed-length code, Exponential-Golomb code, truncated Exponential-Golomb code, Rice code, or any other codes.
         (i) Specifically, mmvd_distance_idx_in_subset can be binarized as a flag if there are only two possible distances in the sub-set.
         (ii) Specifically, mmvd_distance_idx_in_subset is not signaled if there is only one possible distance in the sub-set.
         (iii) Specifically, the maximum value is set to be the number of possible distance in the sub-set minus 1 if mmvd_distance_idx_in_subset is binarized as a truncated code.
   b. In one example, there are two sub-sets (e.g., K=2).
      i. In one example, one sub-set includes all fractional MVD precisions (e.g., ¼-pel, ½-pel). The other sub-set includes all integer MVD precisions (e.g., 1-pel, 2-pel, 4-pel, 8-pel, 16-pel, 32-pel).
      ii. In one example, one sub-set may only have one distance (e.g., ½-pel), and the other sub-set has all the remaining distances.
   c. In one example, there are three sub-sets (e.g., K=3).
      i. In one example, a first sub-set includes fractional MVD precisions (e.g., ¼-pel, ½-pel); a second sub-set includes integer MVD precisions less than 4-pel (e.g. 1-pel, 2-pel); and a third sub-set includes all other MVD precisions (e.g. 4-pel, 8-pel, 16-pel, 32-pel).
   d. In one example, there are K sub-sets and the number of K is set equal to that allowed MVD precisions in LAMVR.
      i. Alternatively, furthermore, the signaling of sub-set index may reuse what is done for LAMVR (e.g., reusing the way to derive context offset index; reusing the contexts, etc., al)
      ii. Distances within a sub-set may be decided by the associated LAMVR index (e.g., AMVR_mode in specifications).
   e. In one example, how to define sub-sets and/or how many sub-sets may be pre-defined or adaptively changed on-the-fly.
   f. In one example, the $1^{st}$ syntax may be coded with truncated unary, fixed-length code, Exponential-Golomb code, truncated Exponential-Golomb code, Rice code, or any other codes.
   g. In one example, the $2^{nd}$ syntax may be coded with truncated unary, fixed-length code, Exponential-Golomb code, truncated Exponential-Golomb code, Rice code, or any other codes.
   h. In one example, the sub-set index (e.g., $1^{st}$ syntax) may be not explicitly coded in the bitstream. Alternatively, furthermore, the sub-set index may be derived on-the-fly, e.g., based on coded information of current block (e.g., block dimension) and/or previously coded blocks.
   i. In one example, the distance index within a sub-set (e.g., $2^{nd}$ syntax) may be not explicitly coded in the bitstream.
      i. In one example, when the sub-set only have one distance, there is no need to further signal the distance index.
      ii. Alternatively, furthermore, the $2^{nd}$ syntax may be derived on-the-fly, e.g., based on coded information of current block (e.g., block dimension) and/ or previously coded blocks.
   j. In one example, a first resolution bin is signaled to indicate whether DI is smaller than a predefined number T or not. Alternatively, a first resolution bin is signaled to indicate whether the distance is smaller than a predefined number or not.
      i. In one example, two syntax elements are used to represent the distance index. mmvd_resolution_flag is first signaled followed by mmvd_distance_idx_in_subset.
      ii. In one example, three syntax elements are used to represent the distance index. mmvd_resolution_flag is first signaled followed by mmvd_short_distance_idx_in_subset when mmvd_resolution_flag is equal to 0 or mmvd_long_distance_idx_in_subset when mmvd_resolution_flag is equal to 1.
      iii. In one example, the distance index number T corresponds to 1-Pel distance. For example, T=2 with the Table 2a defined in VTM-3.0.
      iv. In one example, the distance index number T corresponds to ½-Pel distance. For example, T=1 with the Table 2a defined in VTM-3.0.
      v. In one example, the distance index number T corresponds to W-Pel distance. For example, T=3 corresponding to 2-Pel distance with the Table 2a defined in VTM-3.0.
      vi. In one example, the first resolution bin is equal to 0 if DI is smaller than T. Alternatively, the first resolution bin is equal to 1 if DI is smaller than T.
      vii. In one example, if DI is smaller than T, a code for short distanceindex is further signaled after the first resolution bin to indicate the value of DI.
         (i) In one example, DI is signaled. DI can be binarized with unary code, truncated unary code, fixed-length code, Exponential-Golomb code, truncated Exponential-Golomb code, Rice code, or any other codes.
            a. When DI is binarized as a truncated code such as truncated unary code, the maximum coded value is T−1.
         (ii) In one example, S=T−1−DI is signaled. T−1−DI can be binarized with unary code, truncated unary code, fixed-length code, Exponential-Golomb code, truncated Exponential-Golomb code, Rice code, or any other codes.
            a. When T−1−DI is binarized as a truncated code such as truncated unary code, the maximum coded value is T−1.

b. After S is parsed, DI is reconstructed as DI=T−S−1.

viii. In one example, if DI is not smaller than T, a code for long distanceindex is further signaled after the first resolution bin to indicate the value of DI.

(i) In one example, B=DI−T is signaled. DI−T can be binarized with unary code, truncated unary code, fixed-length code, Exponential-Golomb code, truncated Exponential-Golomb code, Rice code, or any other codes.

a. When DI−T is binarized as a truncated code such as truncated unary code, the maximum coded value is DMax−T, where DMax is the maximum allowed distance, such as 7 in VTM-3.0.

b. After B is parsed, DI is reconstructed as DI=B+T.

(ii) In one example, B'=DMax−DI is signaled, where DMax is the maximum allowed distance, such as 7 in VTM-3.0. DMax−DI can be binarized with unary code, truncated unary code, fixed-length code, Exponential-Golomb code, truncated Exponential-Golomb code, Rice code, or any other codes.

a. When DMax−DI is binarized as a truncated code such as truncated unary code, the maximum coded value is DMax−T, where DMax is the maximum allowed distance, such as 7 in VTM-3.0.

b. After B' is parsed, DI is reconstructed as DI=DMax-B'.

k. In one example, a first resolution bin is signaled to indicate whether DI is greater than a predefined number T or not. Alternatively, a first resolution bin is signaled to indicate whether the distance is greater than a predefined number or not.

i. In one example, the distance index number T corresponds to 1-Pel distance. For example, T=2 with the Table 2a defined in VTM-3.0.

ii. In one example, the distance index number T corresponds to ½-Pel distance. For example, T=1 with the Table 2a defined in VTM-3.0.

iii. In one example, the distance index number T corresponds to W-Pel distance. For example, T=3 corresponding to 2-Pel distance with the Table 2a defined in VTM-3.0.

iv. In one example, the first resolution bin is equal to 0 if DI is greater than T. Alternatively, the first resolution bin is equal to 1 if DI is greater than T.

v. In one example, if DI is not greater than T, a code for short distanceindex is further signaled after the first resolution bin to indicate the value of DI.

(i) In one example, DI is signaled. DI can be binarized with unary code, truncated unary code, fixed-length code, Exponential-Golomb code, truncated Exponential-Golomb code, Rice code, or any other codes.

a. When DI is binarized as a truncated code such as truncated unary code, the maximum coded value is T.

(ii) In one example, S=T−DI is signaled. T−DI can be binarized with unary code, truncated unary code, fixed-length code, Exponential-Golomb code, truncated Exponential-Golomb code, Rice code, or any other codes.

a. When T−DI is binarized as a truncated code such as truncated unary code, the maximum coded value is T.

b. After S is parsed, DI is reconstructed as DI=T−S.

vi. In one example, if DI is greater than T, a code for long distanceindex is further signaled after the first resolution bin to indicate the value of DI.

(i) In one example, B=DI−1−T is signaled. DI−1−T can be binarized with unary code, truncated unary code, fixed-length code, Exponential-Golomb code, truncated Exponential-Golomb code, Rice code, or any other codes.

a. When DI−1−T is binarized as a truncated code such as truncated unary code, the maximum coded value is DMax−1−T, where DMax is the maximum allowed distance, such as 7 in VTM-3.0.

b. After B is parsed, DI is reconstructed as DI=B+T+1.

(ii) In one example, B'=DMax−DI is signaled, where DMax is the maximum allowed distance, such as 7 in VTM-3.0. DMax−DI can be binarized with unary code, truncated unary code, fixed-length code, Exponential-Golomb code, truncated Exponential-Golomb code, Rice code, or any other codes.

a. When DMax−DI is binarized as a truncated code such as truncated unary code, the maximum coded value is DMax−1−T, where DMax is the maximum allowed distance, such as 7 in VTM-3.0.

b. After B' is parsed, DI is reconstructed as DI=DMax-B' l. Several possible binarization methods for the distance index are: (It should be noted that two binarization methods should be considered as identical if a process to change all "1" in one method to be "0" and all "0" in one method to be "1", will produce the same codewords as the other method.)

| Distance IDX | 0 | 1 | 2 | 3 | 4 | 5 | 6 | 7 |
|---|---|---|---|---|---|---|---|---|
| Bins | 01 | 00 | 10 | 110 | 1110 | 11110 | 111110 | 111111 |
| Bins | 01 | 00 | 11 | 101 | 1001 | 10001 | 100001 | 100000 |
| Bins | 00 | 01 | 10 | 110 | 1110 | 11110 | 111110 | 111111 |
| Bins | 00 | 01 | 11 | 101 | 1001 | 10001 | 100001 | 100000 |
| Bins | 11 | 10 | 00 | 010 | 0110 | 01110 | 011110 | 011111 |
| Bins | 11 | 10 | 01 | 001 | 0001 | 00001 | 000001 | 000000 |
| Bins | 10 | 11 | 00 | 010 | 0110 | 01110 | 011110 | 011111 |
| Bins | 10 | 11 | 01 | 001 | 0001 | 00001 | 000001 | 000000 |
| Bins | 010 | 0110 | 0111 | 10 | 110 | 1110 | 11110 | 11111 |
| Bins | 0111 | 0110 | 010 | 10 | 110 | 1110 | 11110 | 11111 |

4. It is proposed that one or more probability contexts are used to code the $1^{st}$ syntax a. In one example, the $1^{st}$ syntax is the first resolution bin mentioned above.

b. In one example, which probability context is used is derived from the first resolution bins of neighbouring blocks.

c. In one example, which probability context is used is derived from the LAMVR values of neighbouring blocks (e.g., AMVR_mode values).

5. It is proposed that one or more probability contexts are used to code the $2^{nd}$ syntax.
   a. In one example, the $2^{nd}$ syntax is the short distance index mentioned above.
      i. In one example, the first bin to code the short distance index is coded with a probability context, and other bins are by-pass coded.
      ii. In one example, the first N bins to code the short distance index are coded with probability contexts, and other bins are by-pass coded.
      iii. In one example, all bins to code the short distance index are coded with probability contexts.
      iv. In one example, different bins may have different probability contexts.
      v. In one example, several bins share a single probability context.
         (i) In one example, these bins are consecutive.
      vi. In one example, which probability context is used is derived from the short distance indices of neighbouring blocks.
   b. In one example, the $2^{nd}$ syntax is long distance index mentioned above.
      i. In one example, the first bin to code the long distance index is coded with a probability context, and other bins are by-pass coded.
      ii. In one example, the first N bins to code the long distance index are coded with probability contexts, and other bins are by-pass coded.
      iii. In one example, all bins to code the long distance index are coded with probability contexts.
      iv. In one example, different bins may have different probability contexts.
      v. In one example, several bins share a single probability context.
         (i) In one example, these bins are consecutive.
      vi. In one example, which probability context is used is derived from the long distance indices of neighbouring blocks.

Interaction with LAMVR

6. It is proposed that the $1^{st}$ syntax (e.g., first resolution bin) is coded depending on the probability models used to code the LAMVR information.
   a. In one example, the first resolution bin is coded with the same manner (e.g., shared context, or same context index derivation method but with neighboring blocks' LAMVR information replaced by MMVD information) as coding the first MVD resolution flag.
      i. In one example, which probability context is used to code the first resolution bin is derived from the LAMVR information of neighbouring blocks.
         (i) In one example, which probability context is used to code the first resolution bin is derived from the first MVD resolution flags of neighbouring blocks.
   b. Alternatively, the first MVD resolution flag is coded and serve as the first resolution bin when the distance index is coded.
   c. In one example, which probability model is used to code the first resolution bin may depend on the coded LAMVR information.
      i. For example, which probability model is used to code the first resolution bin may depend on the MV resolution of neighbouring blocks.

7. It is proposed that the first bin to code the short distance index is coded with a probability context.
   a. In one example, the first bin to code the short distance index is coded with the same manner (e.g., shared context, or same context index derivation method but with neighboring blocks' LAMVR information replaced by MMVD information) as coding the second MVD resolution flag.
   b. Alternatively, the second MVD resolution flag is coded and serve as the first bin to code the short distance index when the distance index is coded.
   c. In one example, which probability model is used to code the first bin to code the short distance index may depend on the coded LAMVR information.
      i. For example, which probability model is used to code the first bin to code the short distance index may depend on the MV resolution of neighbouring blocks.

8. It is proposed that the first bin to code the long distance index is coded with a probability context.
   a. In one example, the first bin to code the long distance index is coded with the same manner (e.g., shared context, or same context index derivation method but with neighboring blocks' LAMVR information replaced by MMVD information) as coding the second MVD resolution flag.
   b. Alternatively, the second MVD resolution flag is coded and serve as the first bin to code the long distance index when the distance index is coded.
   c. In one example, which probability model is used to code the first bin to code the long distance index may depend on the coded LAMVR information.
      i. For example, which probability model is used to code the first bin to code the long distance index may depend on the MV resolution of neighbouring blocks.

9. For the LAMVR mode, in arithmetic coding, the first MVD resolution flag is coded with one of three probability contexts: C0, C1 or C2; while the second MVD resolution flag is coded with a forth probability context: C3. Examples to derive the probability context to code the distance index is described as below.
   a. The probability context Cx for the first resolution bin is derived as (L represents the left neighbouring block and A represents the above neighbouring block):
      If L is available, inter-coded, and its first MVD resolution flag is not equal to zero, xL is set equal to 1; otherwise, xL is set equal to 0.
      If A is available, inter-coded, and its first MVD resolution flag is not equal to zero, xA is set equal to 1; otherwise, xA is set equal to 0.
      x is set equal to xL+xA.
   b. The probability context for the first bin to code the long distance index is C3.
   c. The probability context for the first bin to code the short distance index is C3.

10. It is proposed that the LAMVR MVD resolution is signaled when MMVD mode is applied.
   a. It is proposed that the syntax used LAMVR MVD resolution signaling is reused when coding the side information of MMVD mode.
   b. When the signaled LAMVR MVD resolution is ¼-pel, a short distance index is signaled to indicate the MMVD distance in a first sub-set. For example, the short distance index can be 0 or 1, to represent the MMVD distance to be ¼-pel or ½-pel, respectively.
   c. When the signaled LAMVR MVD resolution is 1-pel, a medium distance index is signaled to indicate the MMVD distance in a second sub-set. For example, the medium distance index can be 0 or 1, to represent the MMVD distance to be 1-pel or 2-pel, respectively.
d. When the signaled LAMVR MVD resolution is 4-pel in a third sub-set, a long distance index is signaled to indicate the MMVD distance. For example, the medium distance index can be X, to represent the MMVD distance to be (4<<X)-pel.
e. In the following disclosure, a sub-set distance index may refer to a short distance index, or a medium distance index, or a long distance index.
  i. In one example, the sub-set distance index can be binarized with unary code, truncated unary code, fixed-length code, Exponential-Golomb code, truncated Exponential-Golomb code, Rice code, or any other codes.
    (i) Specifically, a sub-set distance index can be binarized as a flag if there are only two possible distances in the sub-set.
    (ii) Specifically, a sub-set distance index is not signaled if there is only one possible distance in the sub-set.
    (iii) Specifically, the maximum value is set to be the number of possible distance in the sub-set minus 1 if a sub-set distance index is binarized as a truncated code.
  ii. In one example, the first bin to code the sub-set distance index is coded with a probability context, and other bins are by-pass coded.
  iii. In one example, the first N bins to code the sub-set distance index are coded with probability contexts, and other bins are by-pass coded.
  iv. In one example, all bins to code the sub-set distance index are coded with probability contexts.
  v. In one example, different bins may have different probability contexts.
  vi. In one example, several bins share a single probability context.
    (i) In one example, these bins are consecutive.
  vii. It is proposed that one distance cannot appear in two different distance sub-sets.
  viii. In one example, there may be more distances can be signaled in the short distance sub-set.
    (i) For example, the distances signaled in the short distance sub-set must be in a sub-pel, but not an integer-pel. For example, 5/4-pel, 3/2-pel 7/4-pel may be in the short distance sub-set, but 3-pel cannot be in the short distance sub-set.
  ix. In one example, there may be more distances can be signaled in the medium distance sub-set.
    (i) For example, the distances signaled in the medium distance sub-set must be integer-pel but not in a form of 4N, where N is an integer. For example, 3-pel, 5-pel may be in the medium distance sub-set, but 24-pel cannot be in the medium distance sub-set.
  x. In one example, there may be more distances can be signaled in the long distance sub-set.
    (i) For example, the distances signaled in the long distance sub-set must be integer-pel in a form of 4N, where N is an integer. For example, 4-pel, 8-pel, 16-pel or 24-pel may be in the long distance sub-set.
11. It is proposed that a variable to store the MV resolution of the current block may be decided by the UMVE distance.
  a. In one example, the MV resolution of the current block is set to be ¼-Pel if the UMVE distance<T1 or <=T1.
  b. In one example, the first and second MVD resolution flags of the current block are set to be 0 if the UMVE distance<T1 or <=T1.
  c. In one example, the MV resolution of the current block is set to be 1-Pel if the UMVE distance>T1 or >=T1.
  d. In one example, the first MVD resolution flag of the current block is set to be 1, and the second MVD resolution flag of the current block is set to be 0, if the UMVE distance>T1 or >=T1.
  e. In one example, the MV resolution of the current block is set to be 4-Pel if the UMVE distance>T2 or >=T2.
  f. In one example, the first and second MVD resolution flags of the current block are set to be 1, if the UMVE distance>T2 or >=T2.
  g. In one example, the MV resolution of the current block is set to be 1-Pel if the UMVE distance>T1 or >=T1 and the UMVE distance<T2 or <=T2.
  h. In one example, the first MVD resolution flag of the current block is set to be 1, and the second MVD resolution flag of the current block is set to be 0, if the UMVE distance>T1 or >=T1 and the UMVE distance<T2 or <=T2.
  i. T1 and T2 can be any numbers. For example, T1=1-Pel and T2=4-Pel.
12. It is proposed that a variable to store the MV resolution of the current block may be decided by the UMVE distance index.
  a. In one example, the MV resolution of the current block is set to be ¼-Pel if the UMVE distance index<T1 or <=T1.
  b. In one example, the first and second MVD resolution flags of the current block are set to be 0 if the UMVE distance index<T1 or <=T1.
  c. In one example, the MV resolution of the current block is set to be 1-Pel if the UMVE distance index>T1 or >=T1.
  d. In one example, the first MVD resolution flag of the current block is set to be 1, and the second MVD resolution flag of the current block is set to be 0, if the UMVE distance index>T1 or >=T1.
  e. In one example, the MV resolution of the current block is set to be 4-Pel if the UMVE distance index>T2 or >=T2.
  f. In one example, the first and second MVD resolution flags of the current block are set to be 1, if the UMVE distance index>T2 or >=T2.
  g. In one example, the MV resolution of the current block is set to be 1-Pel if the UMVE distance>T1 or >=T1 and the UMVE distance index<T2 or <=T2.
  h. In one example, the first MVD resolution flag of the current block is set to be 1, and the second MVD resolution flag of the current block is set to be 0, if the UMVE distance index>T1 or >=T1 and the UMVE distance index<T2 or <=T2.
  i. T1 and T2 can be any numbers. For example, T1=2 and T2=3, or T1=2 and T2=4;
13. The variable to store MV resolution of UMVE coded blocks may be utilized for coding following blocks which are coded with LAMVR mode.

a. Alternatively, the variable to store MV resolution of UMVE coded blocks may be utilized for coding following blocks which are coded with UMVE mode.

b. Alternatively, the MV precisions of LAMVR-coded blocks may be utilized for coding following UMVE-coded blocks.

14. The above bullets may be also applicable to coding the direction index.

Mapping Between Distance Index and Distance

15. It is proposed that the relationship between the distance index (DI) and the distance may not be the exponential relationship as in VTM-3.0. (Distance=¼-Pel$\times 2^{DI}$)

a. In one example, the mapping may be piece-wised.
       i. For example, Distance=f1(DI) when T0<=DI<T1, Distance=f2(DI) when T1<=DI<T2, . . . Distance=fn(DI) when Tn−1<=DI<Tn . . . .
          (i) For example, Distance=¼-Pel$\times 2^{DI}$ when DI<T1, Distance=a×DI+b when T1<=DI<T2, and Distance=c×$2^{DI}$ when DI>=T2. In one example, T1=4, a=1, b=−1, T2=6, c=⅛.

16. It is proposed that distance table size may be larger than 8, such as 9, 10, 12, 16.

17. It is proposed that distance shorter than ¼-pel may be included in the distance table, such as ⅛-pel, 1/16-pel or ⅜-pel.

18. It is proposed than distances not in the form of $2^{X}$-pel may be included in the distance table, such as 3-pel, 5-pel, 6-pel, etc.

19. It is proposed that the distance table may be different for different directions.

a. Correspondingly, the parsing process for the distance index may be different for different directions.

b. In one example, four directions with the direction index 0, 1, 2 and 3 have different distance tables.

c. In one example, two x-directions with the direction index 0 and 1 have the same distance table.

d. In one example, two y-directions with the direction index 2 and 3 have the same distance table.

e. In one example, x-directions and y-directions may have two different distance tables.
       i. Correspondingly, the parsing process for the distance index may be different for x-directions and y-directions.
       ii. In one example, the distance table for y-directions may have less possible distances than the distance table for x-directions.
       iii. In one example, the shortest distance in the distance table for y-directions may be shorter than the shortest distance in the distance table for x-directions.
       iv. In one example, the longest distance in the distance table for y-directions may be shorter than the longest distance in the distance table for x-directions.

20. It is proposed that different distance tables may be used for different block width and/or height.

a. In one example, different distance tables may be used for different block width when the direction is along the x-axis.

b. In one example, different distance tables may be used for different block height when the direction is along the y-axis.

21. It is proposed that different distance tables may be used when the POC distance is different. POC difference is calculated as |POC of the current picture−POC of the reference picture|.

22. It is proposed that different distance tables may be used for different base candidates.

23. It is proposed that for the ratio of two distances (MVD precisions) with consecutive indices is not fixed to be 2.

a. In one example, the ratio of two distances (MVD precisions) with consecutive indices is fixed to M (e.g., M=4).

b. In one example, the delta of two distances (MVD precisions) with consecutive indices (instead of ratios) may be fixed for all indices. Alternatively, the delta of two distances (MVD precisions) with consecutive indices may be different for different indices.

c. In one example, the ratio of two distances (MVD precisions) with consecutive indices may be different for different indices.
       i. In one example, the set of distances such as {1-pel, 2-pel, 4-pel, 8-pel, 16-pel, 32-pel, 48-pel, 64-pel} may be used.
       ii. In one example, the set of distances such as {1-pel, 2-pel, 4-pel, 8-pel, 16-pel, 32-pel, 64-pel, 96-pel} may be used.
       iii. In one example, the set of distances such as {1-pel, 2-pel, 3-pel, 4-pel, 5-pel, 16-pel, 32-pel} may be used.

24. The signaling of MMVD side information may be done in the following way:

a. When the current block is inter and non-merge (which may include e.g., non-skip, non-sub-block, non-triangular, non-MHIntra) mode, a MMVD flag may be firstly signaled, followed by a sub-set index of distance, a distance index within the sub-set, a direction index. Here, MMVD is treated as a different mode from merge mode.

b. Alternatively, when the current block is merge mode, a MMVD flag may be further signaled, followed by a sub-set index of distance, a distance index within the sub-set, a direction index. Here, MMVD is treated as a special merge mode.

25. The direction of MMVD and the distance of MMVD may be signaled jointly.

a. In one example, whether and how to signal MMVD distance may depend on MMVD direction.

b. In one example, whether and how to signal MMVD direction may depend on MMVD distance.

c. In one example, a joint codeword is signaled with one or more syntax elements. The MMVD distance and MMVD direction can be derived from the code word. For example, the codeword is equal to MMVD distance index+MMVD direction index*7. In another example, the MMVD a codeword table is designed. Each codeword corresponds to a unique combination of MMVD distance and MMVD direction.

26. Some exemplary UMVE distances tables are listed below:
  a. The distance tables size is 9:

| Distance IDX | 0 | 1 | 2 | 3 | 4 | 5 | 6 | 7 | 8 |
|---|---|---|---|---|---|---|---|---|---|
| Pixel distance | 1/8-pel | 1/4-pel | 1/2-pel | 1-pel | 2-pel | 4-pel | 8-pel | 16-pel | 32-pel |
| Pixel distance | 1/4-pel | 1/2-pel | 1-pel | 2-pel | 3-pel | 4-pel | 8-pel | 16-pel | 32-pel |
| Pixel distance | 1/4-pel | 1/2-pel | 1-pel | 2-pel | 4-pel | 6-pel | 8-pel | 16-pel | 32-pel |
| Pixel distance | 1/4-pel | 1/2-pel | 1-pel | 2-pel | 4-pel | 8-pel | 12-pel | 16-pel | 32-pel |
| Pixel distance | 1/4-pel | 1/2-pel | 1-pel | 2-pel | 4-pel | 8-pel | 16-pel | 24-pel | 32-pel | b. The distance tables size is 10:

| Distance IDX | 0 | 1 | 2 | 3 | 4 | 5 | 6 | 7 | 8 | 9 |
|---|---|---|---|---|---|---|---|---|---|---|
| Pixel distance | 1/8-pel | 1/4-pel | 1/2-pel | 1-pel | 2-pel | 4-pel | 8-pel | 16-pel | 32-pel | 64-pel |
| Pixel distance | 1/8-pel | 1/4-pel | 1/2-pel | 1-pel | 2-pel | 3-pel | 4-pel | 8-pel | 16-pel | 32-pel |
| Pixel distance | 1/8-pel | 1/4-pel | 1/2-pel | 1-pel | 2-pel | 4-pel | 6-pel | 8-pel | 16-pel | 32-pel |
| Pixel distance | 1/8-pel | 1/4-pel | 1/2-pel | 1-pel | 2-pel | 4-pel | 8-pel | 12-pel | 16-pel | 32-pel |
| Pixel distance | 1/8-pel | 1/4-pel | 1/2-pel | 1-pel | 2-pel | 4-pel | 8-pel | 16-pel | 24-pel | 32-pel |
| Pixel distance | 1/4-pel | 1/2-pel | 1-pel | 2-pel | 3-pel | 4-pel | 6-pel | 8-pel | 16-pel | 32-pel |
| Pixel distance | 1/4-pel | 1/2-pel | 1-pel | 2-pel | 4-pel | 6-pel | 8-pel | 12-pel | 16-pel | 32-pel |
| Pixel distance | 1/4-pel | 1/2-pel | 1-pel | 2-pel | 3-pel | 4-pel | 8-pel | 12-pel | 16-pel | 32-pel |
| Pixel distance | 1/4-pel | 1/2-pel | 1-pel | 2-pel | 3-pel | 4-pel | 8-pel | 16-pel | 24-pel | 32-pel | a. The distance tables size is 12:

| Distance IDX | 0 | 1 | 2 | 3 | 4 | 5 | 6 | 7 | 8 | 9 | 10 | 11 |
|---|---|---|---|---|---|---|---|---|---|---|---|---|
| Pixel distance | 1/8-pel | 1/4-pel | 1/2-pel | 1-pel | 2-pel | 3-pel | 4-pel | 6-pel | 8-pel | 16-pel | 32-pel | 64-pel |
| Pixel distance | 1/8-pel | 1/4-pel | 1/2-pel | 1-pel | 2-pel | 3-pel | 4-pel | 8-pel | 12-pel | 16-pel | 24-pel | 32-pel |
| Pixel distance | 1/4-pel | 1/2-pel | 1-pel | 2-pel | 3-pel | 4-pel | 6-pel | 8-pel | 12-pel | 16-pel | 24-pel | 32-pel |
| Pixel distance | 1/4-pel | 1/2-pel | 1-pel | 2-pel | 3-pel | 4-pel | 6-pel | 8-pel | 12-pel | 16-pel | 32-pel | 64-pel |

27. It is proposed that MMVD distance may be signaled in a granularity-signaling method. The distance is firstly signaled by index with a rough granularity, followed by one or more indices with finer granularities.
  a. For example, a first index $F_1$ represents distances in an ordered set $M_1$; a second index $F_2$ represents distances in an ordered set $M_2$. The final distance is calculated as, such as $M_1[F_1]+M_2[F_2]$.
  b. For example, a first index $F_1$ represents distances in an ordered set $M_1$; a second index $F_2$ represents distances in an ordered set $M_2$; and so on, until a nth index $F_n$ represents distances in an ordered set $M_n$. The final distance is calculated as $M_1[F_1]+M_2[F_2]+ \ldots +M_n[F_n]$.
  c. For example, the signaling or binarization of $F_k$ may depend on the signaled $F_{k-1}$.
    i. In one example, an entry in $M_k[F_k]$ must be smaller than $M_{k-1}[F_{k-1}+1]-M_{k-1}[F_{k-1}]$ when $F_{k-1}$ is not the largest index referring to $M_{k-1}$. $1<k<=n$.
  d. For example, the signaling or binarization of $F_k$ may depend on the signaled $F_S$ for all $1<=s<k$.
    i. In one example, an entry in $M_k[F_k]$ must be smaller than $M_s[F_s+1]-M_S[F_S]$ for all $1<=s<k$, when $1<k<=n$.
  e. In one example, if $F_k$ is the largest index referring to $M_k$, then no further $F_{k+1}$ is signaled, and the final distance is calculated as $M_1[F_1]+M_2[F_2]+ \ldots +M_k[F_k]$, where $1<=k<=n$.
  f. In one example, the entries in $M_k[F_k]$ may depend on the signaled $F_{k-1}$.
  g. In one example, the entries in $M_k[F_k]$ may depend on the signaled $F_S$ for all $1<=s<k$.
  h. For example, n=2. $M_1$={¼-pel, 1-pel, 4-pel, 8-pel, 16-pel, 32-pel, 64-pel, 128-pel},
    i. $M_2$={0-pel, ¼-pel} when $F_1=0$ ($M_1[F_1]=1/4$-pel);
    ii. $M_2$={0-pel, 1-pel, 2-pel} when $F_1=1$ ($M_1[F_1]=1$-pel);
    iii. $M_2$={0-pel, 1-pel, 2-pel, 3-pel} when $F_1=2$ ($M_1[F_1]=4$-pel);
    iv. $M_2$={0-pel, 2-pel, 4-pel, 6-pel} when $F_1=3$ ($M_1[F_1]=8$-pel);
    v. $M_2$={0-pel, 4-pel, 8-pel, 12-pel} when $F_1=4$ ($M_1[F_1]=16$-pel);
    vi. $M_2$={0-pel, 8-pel, 16-pel, 24-pel} when $F_1=5$ ($M_1[F_1]=32$-pel);
    vii. $M_2$={0-pel, 16-pel, 32-pel, 48-pel} when $F_1=6$ ($M_1[F_1]=32$-pel);

Slice/Picture Level Control

28. It is proposed that how to signal the MMVD side information (e.g., MMVD distance) and/or how to interpret the signaled MMVD side information (e.g., distance index to the distance), may depend on information signaled or inferred at a level higher than CU level. (e.g. sequence level, or picture level or slice level, or tile group level, such as in VPS/SPS/PPS/slice header/picture header/tile group header).
  a. In one example, a code table index is signaled or inferred at a higher level. A specific code table is determined by the table index. The distance index may be signaled with the methods disclosed in item 1-26. Then the distance is derived by querying the entry with the signaled distance index in the specific code table.
  b. In one example, a parameter X is signaled or inferred at a higher level. The distance index may be signaled with the methods disclosed in item 1-26. Then a distance D' is derived by querying the entry with the signaled distance index in a code table. Then the final distance D is calculated as D=f(D', X). f can be any function. For example, f(D', X)=D'<<X or f(D', X)=D'*X, or f(D', X)=D'+X, or f(D', X)=D' right shifted by X (with rounding or not).
  c. In one example, valid MV resolution is signaled or inferred at a higher level. Only the MMVD distances with valid MV resolution can be signaled.
    i. For example, the signaling method of MMVD information at CU level may depend on the valid MV resolutions signaled at a higher level.

(i) For example, the signaling method of MMVD distance resolution information at CU level may depend on the valid MV resolutions signaled at a higher level.
(ii) For example, the number of distance sub-sets may depend on the valid MV resolutions signaled at a higher level.
(iii) For example, the meaning of each sub-set may depend on the valid MV resolutions signaled at a higher level.
ii. For example, a minimum MV resolution (such as ¼-pel, or 1-pel, or 4-pel) is signaled.
(i) For example, when the minimum MV resolution is ¼-pel, the distance index is signaled as disclosed in item 1-26.
(ii) For example, when the minimum MV resolution is 1-pel, the flag to signal whether the distance resolution is ¼-pel (such as the first resolution bin in LAMVR) is not signaled. Only medium distance index and long distance index disclosed in Item 10 can be signaled following the LAMVR information.
(iii) For example, when the minimum MV resolution is 4-pel, the flag to signal whether the distance resolution is ¼-pel (such as the first resolution bin in LAMVR) is not signaled; and the flag to signal whether the distance resolution is 1-pel (such as the second resolution bin in LAMVR) is not signaled. Only long distance index disclosed in Item 10 can be signaled following the LAMVR information.
(iv) For example, when the minimum MV resolution is 1-pel, the distance resolution is signaled in the same manner as when the minimum MV resolution is ¼-pel. But the meanings of distance sub-sets may be different.
a. For example, the short distance sub-set represented by the short distance index is redefined as the very-long distance sub-set. For example, two distances that can be signaled within this very-long sub-set are 64-pel and 128-pel.

29A. It is proposed the encoder may decide whether the slice/tile/picture/sequence/group of CTUs/group of blocks is screen content or not by checking the ratio of the block that has one or more similar or identical blocks within the same slice/tile/picture/sequence/group of CTUs/group of blocks.
a. In one example, if the ratio is larger than a threshold, it is considered as screen content.
b. In one example, if the ratio is larger than a first threshold and smaller than a second threshold, it is considered as screen content.
c. In one example, the slice/tile/picture/sequence/group of CTUs/group of blocks may be split into M×N non-overlapped blocks. For each M×N block, the encoder checks whether there is another (or more) M×N block is similar with or identical to it. For example, M×N is equal to 4×4.
d. In one example, only partial of the blocks are checked when calculating the ratio. For example, only blocks in even row and even columns are checked.
e. In one example, a key value, e.g., cyclic redundancy check (CRC) code, may be generated for each M×N block, key values of two blocks are compared to check whether the two blocks are identical or not.

i. In one example, the key value may be generated using only some color components of the block. For example, the key value is generated by using luma component only.
ii. In one example, the key value may be generated using only some pixels of the block. For example, only even rows of the block are used.
f. In one example, SAD/SATD/SSE or mean-removed SAD/SATD/SSE may be used to measure the similarity of two blocks.
i. In one example, SAD/SATD/SSE or mean-removed SAD/SATD/SSE may be only calculated for some pixels. For example, SAD/SATD/SSE or mean-removed SAD/SATD/SSE is only calculated for the even rows.

Affine MMVD

29B. It is proposed that the indications of usage of Affine MMVD may be signaled only when the merge index of the sub-block merge list is larger than K (where K=0 or 1).
a. Alternatively, when there are separate lists for affine merge list and other merge lists (such as ATMVP list), the indication of usage of affine MMVD may be signaled only when the affine mode is enabled. Alternatively, furthermore, the indication of usage of affine MMVD may be signaled only when the affine mode is enabled and there are more than 1 base affine candidate.

30. It is proposed that the MMVD method can also be applied to other sub-block based coding tools in addition to affine mode, such as ATMVP mode. In one example, if the current CU applies ATMVP, and MMVD on/off flag is set to be 1, MMVD is applied to ATMVP.
a. In one example, one set of MMVD side information may be applied to all sub-blocks, in this case, one set of MMVD side information signaled. Alternatively, different sub-blocks may choose different sets, in this case, multiple sets of MMVD side information may be signaled.
b. In one embodiment, the MV of each sub-block is added with the signaled MVD (a.k.a. offset or distance)
c. In one embodiment, the method to signal the MMVD information when the sub-block merge candidate is an ATMVP merge candidate is the same to the method when the sub-block merge candidate is an affine merge candidate.
d. In one embodiment, a POC distance based offset mirroring method is used for Bi-prediction to add the MVD on the MV of each sub-block when the sub-block merge candidate is an ATMVP merge candidate.

31. It is proposed that the MV of each sub-block is added with the signaled MVD (a.k.a. offset or distance) when the sub-block merge candidate is an affine merge candidate.

32. It is proposed that the MMVD signaling methods disclosed in bullet 1-28 can also be applied to signal the MVD used by the affine MMVD mode.
a. In one embodiment, the LAMVR information used to signal the MMVD information of affine MMVD mode may be different from the LAMVR information used to signal the MMVD information of non-affine MMVD mode.
i. For example, the LAMVR information used to signal the MMVD information of affine MMVD mode are also used to signal the MV precision used in affine inter-mode; but the LAMVR information used to signal the MMVD information of non-affine MMVD mode is used to signal the MV precision used in non-affine inter-mode.

33. It is proposed that the MVD information in MMVD mode for sub-block merge candidates should be signaled in the same way as the MVD information in MMVD mode for regular merge candidates.
   a. For example, they share the same distance table;
   b. For example, they share the same mapping between the a distance index and a distance.
   c. For example, they share the same directions.
   d. For example, they share the same binarization methods.
   e. For example, they share the same arithmetic coding contexts.
34. It is proposed that the MMVD side information signalling may be dependent on the coded mode, such as affine or normal merge or triangular merge mode or ATMVP mode.
35. It is proposed that the pre-defined MMVD side information may be dependent on the coded mode, such as affine or normal merge or triangular merge mode or ATMVP mode.
36. It is proposed that the pre-defined MMVD side information may be dependent on the color subsampling method (e.g., 4:2:0, 4:2:2, 4:4:4), and/or color component. Triangle MMVD
37. It is proposed that MMVD can be applied on triangular prediction mode.
   a. After a TPM merge candidate is signaled, the MMVD information is signaled. The signaled TPM merge candidate is treated as the base merge candidate.
      i. For example, the MMVD information is signaled with the same signaling method as the MMVD for regular merge;
      ii. For example, the MMVD information is signaled with the same signaling method as the MMVD for affine merge or other kinds of sub-block merge;
      iii. For example, the MMVD information is signaled with a signaling method different to that of the MMVD for regular merge, affine merge or other kinds of sub-block merge;
   b. In one example, the MV of each triangle partition is added with the signaled MVD;
   c. In one example, the MV of one triangle partition is added with the signaled MVD, and the MV of the other triangle partition is added with f(signaled MVD), f is any function.
      i. In one example, f depends on the reference picture POCs or reference indices of the two triangle partitions.
      ii. In one example, f(MVD)=−MVD if the reference picture of one triangle partition is before the current picture in displaying order and the reference picture of the other triangle partition is after the current picture in displaying order.
38. It is proposed that the MMVD signaling methods disclosed in bullet 1-28 can also be applied to signal the MVD used by the triangular MMVD mode.
   a. In one embodiment, the LAMVR information used to signal the MMVD information of affine MMVD mode may be different from the LAMVR information used to signal the MMVD information of non-affine MMVD mode.
      i. For example, the LAMVR information used to signal the MMVD information of affine MMVD mode are also used to signal the MV precision used in affine inter-mode; but the LAMVR information used to signal the MMVD information of non-affine MMVD mode is used to signal the MV precision used in non-affine inter-mode.
39. For all above bullets, the MMVD side information may include e.g., the offset table (distance), and direction information.

5. Example Embodiments

This section shows some embodiments for the improved MMVD design.

5.1 Embodiment #1 (MMVD Distance Index Coding)

In one embodiment, to code MMVD distance, a first resolution bin is coded. For example, it may be coded with the same probability context as the first flag of MV resolution.

If the resolution bin is 0, a following flag is coded. For example, it may be coded with another probability context to indicate the short distance index. If the flag is 0, the index is 0; if the flag is 1, the index is 1.

Otherwise (the resolution bin is 0), the long distance index L is coded as a truncated unary code, with the maximum value MaxDI−2, where MaxDI is the maximum possible distance index, equal to 7 in the embodiment. After paring out L, the distance index is reconstructed as L+2. In an exemplary C-style embodiment:

```
DI = 2;
while( DI<7 ){
    oneBin = parseOneBin( );
    if(oneBin == 0){
        break;
    }
    DI++;
}
```

The first bin of the long distance index is coded with a probability context, and other bins are by-pass coded. In a C-style embodiment:

```
DI = 2;
while( DI<7 ){
    if( DI==2){
        oneBin = parseOneBinWithContext( );
    }
    else{
        oneBin = parseOneBinBypass( );
    }
    if(oneBin == 0){
        break;
    }
    DI++;
}
```

An example of proposed syntax changes are highlighted, and the deleted parts are marked with strikethrough.

| | |
|---|---|
| ... | |
| mmvd_flag[ x0 ][ y0 ] | ae (v) |
| if( mmvd_flag[ x0 ][ y0 ] = =1 ) ( | |
| mmvd_merge_flag[ x0 ][ y0 ] | ae (v) |
| ~~mmvd_distance_idx~~ [ x0 ][ y0 ] | ae (v) |
| mmvd_distance_subset_idx[ x0 ][ y0 ] | ae (v) |
| mmvd_distance_idx_in_subset[ x0 ][ y0 ] | ae (v) |
| mmvd_direction_idx[ x0 ][ y0 ] | ae (v) |
| ... | |

In one example, the mmvd_distance_subset_idx represents the resolution index as mentioned above, mmvd_distance_idx_in_subset represents the short or long distance index according to the resolution index. Truncated unary may be used to code mmvd_distance_idx_in_subset.

In a Radom Access test under the common test condition, the embodiment can achieve 0.15% coding gain in average and 0.34% gain on UHD sequences (class A1).

|  | Y | U | V |
|---|---|---|---|
| Class A1 | −0.34% | −0.86% | −0.50% |
| Class A2 | −0.15% | 0.30% | 0.07% |

-continued

|  | Y | U | V |
|---|---|---|---|
| Class B | −0.09% | 0.13% | −0.44% |
| Class C | −0.08% | 0.05% | 0.09% |
| Class E |  |  |  |
| Overall | −0.15% | −0.06% | −0.21% |
| Class D | −0.05% | 0.23% | −0.10% |
| Class F | −0.18% | −0.08% | −0.26% |

5.2 Embodiment #2 (MMVD Side Information Coding)

MMVD is treated as a separate mode which is not treated as a merge mode. Therefore, MMVD flag may be further coded only when merge flag is 0.

|  | Descriptor |
|---|---|
| coding_unit( x0, y0, cbWidth, cbHeight, treeType ) { |  |
|   if( slice_type != I ) { |  |
|     cu_skip_flag[ x0 ][ y0 ] | ae(v) |
|     if( cu_skip_flag[ x0 ][ y0 ] = = 0 ) |  |
|       pred_mode_flag | ae(v) |
|   } |  |
|   if( CuPredMode[ x0 ][ y0 ] = = MODE_INTRA ) { |  |
|   ... |  |
|     } |  |
|   } else { /* MODE_INTER */ |  |
|     if( cu_skip_flag[ x0 ][ y0 ] = = 0 ) { |  |
|       merge_flag[ x0 ][ y0 ] | ae(v) |
|       if( merge_flag[ x0 ][ y0 ] ) { |  |
|         merge_data( x0, y0, cbWidth, cbHeight ) |  |
|       } else { |  |
|         mmvd_flag[ x0 ][ y0 ] | ae(v) |
|         if( mmvd_flag[ x0 ][ y0 ] = = 1 ) { |  |
|           mmvd_merge_flag[ x0 ][ y0 ] | ae(v) |
|           mmvd_distance_subset_idx[ x0 ][ y0 ] | ae(v) |
|           mmvd_distance_idx_in_subset[ x0 ][ y0 ] | ae(v) |
|           mmvd_direction_idx[ x0 ][ y0 ] | ae(v) |
|         } else { |  |
|           if( slice_type = = B ) |  |
|             inter_pred_idc[ x0 ][ y0 ] | ae(v) |
|           if( sps_affine_enabled_flag&&cbWidth>= 16 &&cbHeight>= 16 ) { |  |
|             inter_affine_flag[ x0 ][ y0 ] | ae(v) |
|             if( sps_affine_type_flag&&inter_affine_flag[ x0 ][ y0 ] ) |  |
|               cu_affine_type_flag[ x0 ][ y0 ] | ae(v) |
|           } |  |
|   ... |  |
|     } |  |
|   } |  |
| merge_data( x0, y0, cbWidth, cbHeight ) { |  |
|   ~~mmvd_flag[ x0 ][ y0 ]~~ | ~~ae(v)~~ |
|   ~~if( mmvd_flag[ x0 ][ y0 ] = = 1 ) {~~ |  |
|     ~~mmvd_merge_flag[ x0 ][ y0 ]~~ | ~~ae(v)~~ |
|     ~~mmvd_distance_idx[ x0 ][ y0 ]~~ | ~~ae(v)~~ |
|     ~~mmvd_direction_idx[ x0 ][ y0 ]~~ | ~~ae(v)~~ |
|   ~~} else {~~ |  |
|   if( MaxNumSubblockMergeCand> 0&&cbWidth>= 8 &&cbHeight>= 8) |  |
|     merge_subblock_flag[ x0 ][ y0 ] | ae(v) |
|   if( merge_subblock_flag[ x0 ][ y0 ] = = 1 ) { |  |
|     if( MaxNumSubblockMergeCand> 1 ) |  |
|       merge_subblock_idx[ x0 ][ y0 ] | ae(v) |
|   } else { |  |
|     if( sps_mh_intra_enabled_flag&&cu_skip_flag[ x0 ][ y0 ] = = 0 && |  |
|       ( cbWidth * cbHeight )>= 64&&cbWidth< 128 &&cbHeight< 128 ) { |  |
|       mh_intra_flag[ x0 ][ y0 ] | ae(v) |
|     if( mh_intra_flag[ x0 ][ y0 ] ) { |  |
|       if ( cbWidth<= 2 * cbHeight \| \| cbHeight<= 2 * cbWidth ) |  |
|         mh_intra_luma_mpm_flag[ x0 ][ y0 ] | ae(v) |
|       if( mh_intra_luma_mpm_flag[ x0 ][ y0 ] ) |  |
|         mh_intra_luma_mpm_idx[ x0 ][ y0 ] | ae(v) |
|     } |  |
|   } |  |

-continued

| | Descriptor |
|---|---|
|     if( sps_triangle_enabled_flag&&slice_type = = B &&cbWidth * cbHeight>= 16 ) | |
|       merge_triangle_flag[ x0 ][ y0 ] | ae(v) |
|     if( merge_triangle_flag[ x0 ][ y0 ] ) | |
|       merge_triangle_idx[ x0 ][ y0 ] | ae(v) |
|     else if( MaxNumMergeCand> 1 ) | |
|       merge_idx[ x0 ][ y0 ] | ae(v) |
|   } | |
| } | |

In one embodiment, the MMVD information is signaled as:

| | Descriptor |
|---|---|
| if( mmvd_flag[ x0 ][ y0 ] = = 1 ) { | |
|   mmvd_merge_flag[ x0 ][ y0 ] | ae(v) |
|   amvr_mode[ x0 ][ y0 ] | ae(v) |
|   mmvd_distance_idx_in_subset[ x0 ][ y0 ] | ae(v) |
|   mmvd_direction_idx[ x0 ][ y0 ] | ae(v) |
| } | | mmvd_distance_idx_in_subset[x0][y0] is binarized as a truncated unary code. The maximum value of the truncated unary code is 1 if amvr_mode[x0][y0]<2; Otherwise (amvr_mode[x0][y0] is equal to 2), The maximum value is set to be 3. mmvd_distance_idx[x0][y0] is set equal to mmvd_distance_idx_in_subset[x0][y0]+2*amvr_mode[x0][y0].

Which probability contexts are used by mmvd_distance_idx_in_subset[x0][y0] depends on amvr_mode[x0][y0].

5.3 Embodiment #3 (MMVD Slice Level Control)

In slice header, a syntax element mmvd_integer_flag is signaled.

The syntax change is described as follows, and the newly added parts are highlighted in italics 7.3.2.1 Sequence Parameter Set RBSP Syntax

| | Descriptor |
|---|---|
| seq_parameter_set_rbsp( ) { | |
|   ... | |
|   sps_gbi_enabled_flag | u(1) |
|   sps_mh_intra_enabled_flag | u(1) |
|   sps_fracmmvd_enabled_flag | u(1) |
|   sps_triangle_enabled_flag | u(1) |
|   sps_ladf_enabled_flag | u(1) |
|   if ( sps_ladf_enabled_flag ) { | |
|     sps_num_ladf_intervals_minus2 | u(2) |
|     sps_ladf_lowest_interval_qp_offset | se(v) |

-continued

| | Descriptor |
|---|---|
|     for( i = 0; i<sps_num_ladf_intervals_minus2 + 1; i++) { | |
|       sps_ladf_qp_offset[ i ] | se(v) |
|       sps_ladf_delta_threshold_minus1[ i ] | ue(v) |
|     } | |
|   } | |
|   rbsp_trailing_bits( ) | |
| } | |

7.3.3.1 General Slice Header Syntax

| | Descriptor |
|---|---|
| slice_header( ) { | |
|   ... | ue(v) |
|   if ( slice_type!= I ) { | |
|     if( sps_temporal_mvp_enabled_flag) | |
|       slice_temporal_mvp_enabled_flag | u(1) |
|     if( slice_type = = B) | |
|       mvd_l1_zero_flag | u(1) |
|     if( slice_temporal_mvp_enabled_flag ) { | |
|       if( slice_type = = B ) | |
|         collocated_from_l0_flag | u(1) |
|     } | |
|     six_minus_max_num_merge_cand | ue(v) |
|     if( sps_affine_enable_flag ) | |
|       five_minus_max_num_subblock_merge_cand | ue(v) |
|     if( sps_fracmmvd_enable_flag ) | |
|       slice_fracmmvd_flag | u(1) |
|   } | |
|   slice_qp_delta | se(v) |
|   ... | |
| } | |

7.4.3.1 Sequence Parameter Set RBSP Semantics sps_fracmmvd_enabled_flag equal to 1 specifies that slice_fracmmvd_flag is present in the slice header syntax for B slices and P slices. sps_fracmmvd_enabled_flag equal to 0 specifies that slice_fracmmvd_flag is not present in the slice header syntax for B slices and P slices.

7.4.4.1 General Slice Header Semantics slice_fracmmvd_flag specifies the distance table used to derive MmvdDistance[x0][y0]. When not present, the value of slice_fracmmvd_flag is inferred to be 1.

| | Descriptor |
|---|---|
| coding_unit( x0, y0, cbWidth, cbHeight, treeType ) { | |
|   if( slice_type != I ) { | |
|     cu_skip_flag[ x0 ][ y0 ] | ae(v) |
|     if( cu_skip_flag[ x0 ][ y0 ] = = 0 ) | |
|       pred_mode_flag | ae(v) |
|   } | |

|  | Descriptor |
|---|---|
| if( CuPredMode[ x0 ][ y0 ] = = MODE_INTRA ) { | |
| ... | |
| } | |
| } else ( /* MODE_INTER */ | |
|   if( cu_skip_flag[ x0 ][ y0 ] = = 0 ) { | |
|     merge_flag[ x0 ][ y0 ] | ae(v) |
|   if( merge_flag[ x0 ][ y0 ] ) { | |
|     merge_data( x0, y0, cbWidth, cbHeight ) | |
|   } else { | |
|     mmvd_flag[ x0 ][ y0 ] | ae(v) |
|     if( mmvd_flag[ x0 ][ y0 ] = = 1 ) { | |
|       mmvd_merge_flag[ x0 ][ y0 ] | ae(v) |
|       mmvd_distance_subset_idx[ x0 ][ y0 ] | ae(v) |
|       mmvd_distance_idx_in_subset[ x0 ][ y0 ] | ae(v) |
|       mmvd_direction_idx[ x0 ][ y0 ] | ae(v) |
|     } else { | |
|       if( slice_type = = B ) | |
|         inter_pred_idc[ x0 ][ y0 ] ae(v) | |
|       if( sps_affine_enabled_flag&&cbWidth>= 16 &&cbHeight>= 16 ) | |
| { | |
|       inter_affine_flag[ x0 ][ y0 ] | ae(v) |
|       if( sps_affine_type_flag&&inter_affine_flag[ x0 ][ y0 ] ) | |
|         cu_affine_type_flag[ x0 ][ y0 ] | ae(v) |
|       } | |
| ... | |
|   } | |
| } | |
| merge_data( x0, y0, cbWidth, cbHeight) { | |
| ~~mmvd_flag[ x0 ][ y0 ]~~ | ~~ae(v)~~ |
| ~~if( mmvd_flag[ x0 ][ y0 ] = = 1 ) {~~ | |
|   ~~mmvd_merge_flag[ x0 ][ y0 ]~~ | ~~ae(v)~~ |
|   ~~mmvd_distance_idx[ x0 ][ y0 ]~~ | ~~ae(v)~~ |
|   ~~mmvd_direction_idx[ x0 ][ y0 ]~~ | ~~ae(v)~~ |
| ~~} else {~~ | |
| if( MaxNumSubblockMergeCand> 0&&cbWidth>= 8 &&cbHeight>= 8 ) | |
|   merge_subblock_flag[ x0 ][ y0 ] | ae(v) |
| if( merge_subblock_flag[ x0 ][ y0 ] == 1 ) { | |
|   if( MaxNumSubblockMergeCand> 1 ) | |
|     merge_subblock_idx[ x0 ][ y0 ] | ae(v) |
| } else { | |
|   if( sps_mh_intra_enabled_flag&&cu_skip_flag[ x0 ][ y0 ] == 0 && | |
|     ( cbWidth * cbHeight )>=64&&cbWidth< 128 &&cbHeight< 128 ) { | |
|     mh_intra_flag[ x0 ][ y0 ] | ae(v) |
|     if( mh_intra_flag[ x0 ][ y0 ] ) { | |
|       if ( cbWidth<= 2 * cbHeight \|\| cbHeight<= 2 * cbWidth ) | |
|         mh_intra_luma_mpm_flag[ x0 ][ y0 ] | ae(v) |
|       if( mh_intra_luma_mpm_flag[ x0 ][ y0 ] ) | |
|         mh_intra_luma_mpm_idx[ x0 ][ y0 ] | ae(v) |
|     } | |
|   } | |
|   if( sps_triangle_enabled_flag&&slice_type = = B | |
| &&cbWidth * cbHeight>= 16 ) | |
|     merge_triangle_flag[ x0 ][ y0 ] | ae(v) |
|   if( merge_triangle_flag[ x0 ][ y0 ] ) | |
|     merge_triangle_idx[ x0 ][ y0 ] | ae(v) |
|   else if( MaxNumMergeCand> 1 ) | |
|     merge_idx[ x0 ][ y0 ] | ae (v) |
| } | |
| } | |

In one embodiment, the MMVD information is signaled as:

| | |
|---|---|
| if( mmvd_flag[ x0 ][ y0 ] = =1 ) ( | |
|   mmvd_merge_flag[ x0 ][ y0 ] | ae(v) |
|   amvr_mode[ x0 ][ y0 ] | ae(v) |
|   mmvd_distance_idx_in_subset[ x0 ][ y0 ] | ae(v) |
|   mmvd_direction_idx[ x0 ][ y0 ] | ae(v) |
| } | | mmvd_distance_idx_in_subset[x0][y0] is binarized as a truncated unary code. The maximum value of the truncated unary code is 1 if amvr_mode[x0][y0]<2; Otherwise (amvr_mode[x0][y0] is equal to 2), The maximum value is set to be 3. mmvd_distance_idx[x0][y0] is set equal to mmvd_distance_idx_in_subset[x0][y0]+2*amvr_mode[x0][y0]. In one example, the probability contexts are used by mmvd_distance_idx_in_subset[x0][y0] depends on amvr_mode[x0][y0].

The array indices x0, y0 specify the location (x0, y0) of the top-left luma sample of the considered coding block relative to the top-left luma sample of the picture. The mmvd_distance_idx[x0][y0] and the MmvdDistance[x0][y0] is as follows:

TABLE 7-9

Specification of MmvdDistance[ x0 ][ y0 ] based on
mmvd_distance_idx[ x0 ][ y0 ] when
slice_fracmmvd_flag is equal to 1.

| mmvd_distance_idx[ x0 ][ y0 ] | MmvdDistance[ x0 ][ y0 ] |
|---|---|
| 0 | 1 |
| 1 | 2 |
| 2 | 4 |
| 3 | 8 |
| 4 | 16 |
| 5 | 32 |
| 6 | 64 |
| 7 | 128 |

TABLE 7-9

Specification of MmvdDistance[ x0 ][ y0 ]
based on mmvd_distance_idx[ x0 ][ y0 ]
when slice_fracmmvd_flag is equal to 0.

| mmvd_distance_idx[ x0 ][ y0 ] | MmvdDistance[ x0 ][ y0 ] |
|---|---|
| 0 | 4 |
| 1 | 8 |
| 2 | 16 |
| 3 | 32 |
| 4 | 64 |
| 5 | 128 |
| 6 | 256 |
| 7 | 512 |

When mmvd_integer_flag is equal to 1, mmvd_distance=mmvd_distance<<2.

Figure 10:
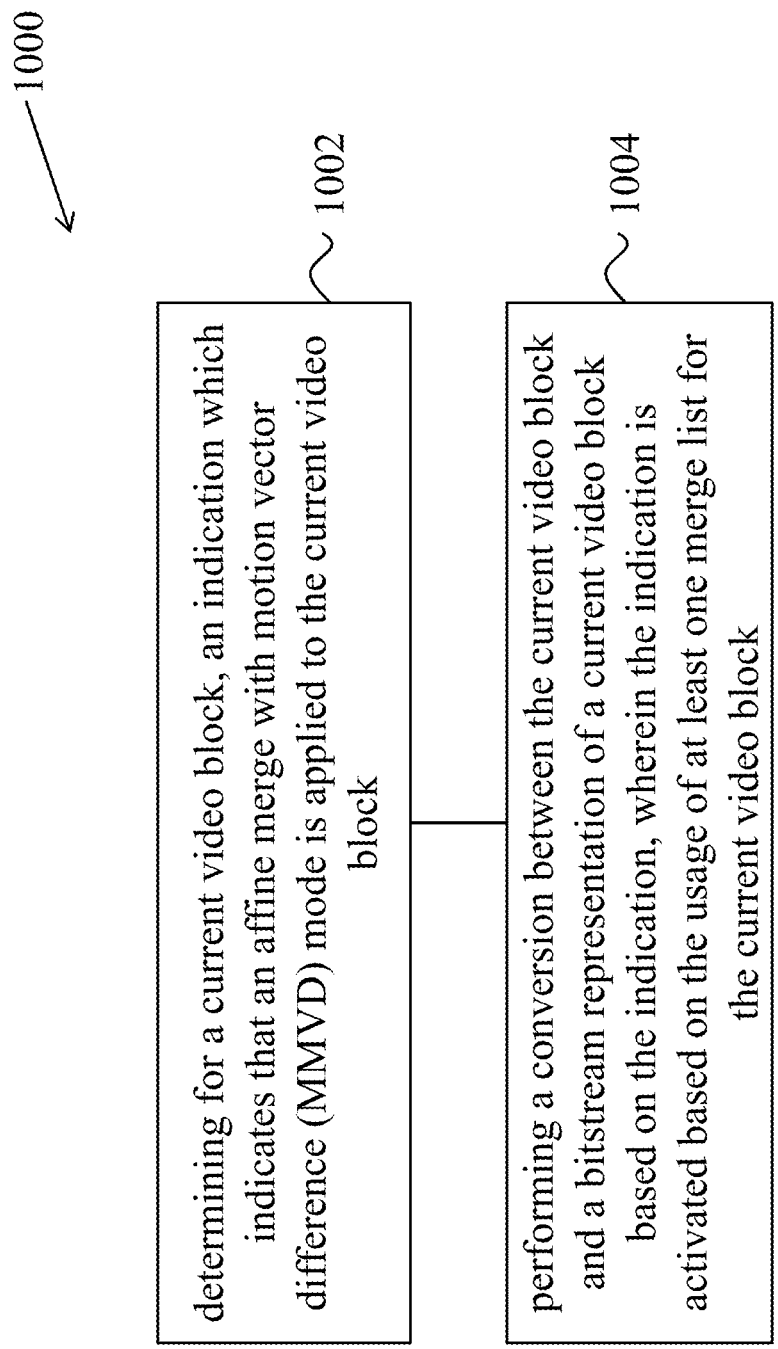
FIG. 10 is a flowchart for an example method for video processing.

FIG. 10 is a flowchart for an example method 1000 for video processing. The method 1000 includes: determining (1002) for a current video block, an indication which indicates that an affine merge with motion vector difference (MMVD) mode is applied to the current video block; performing (1004) a conversion between the current video block and a bitstream representation of a current video block based on the indication, wherein the indication is activated based on the usage of at least one merge list for the current video block.

Figure 11:
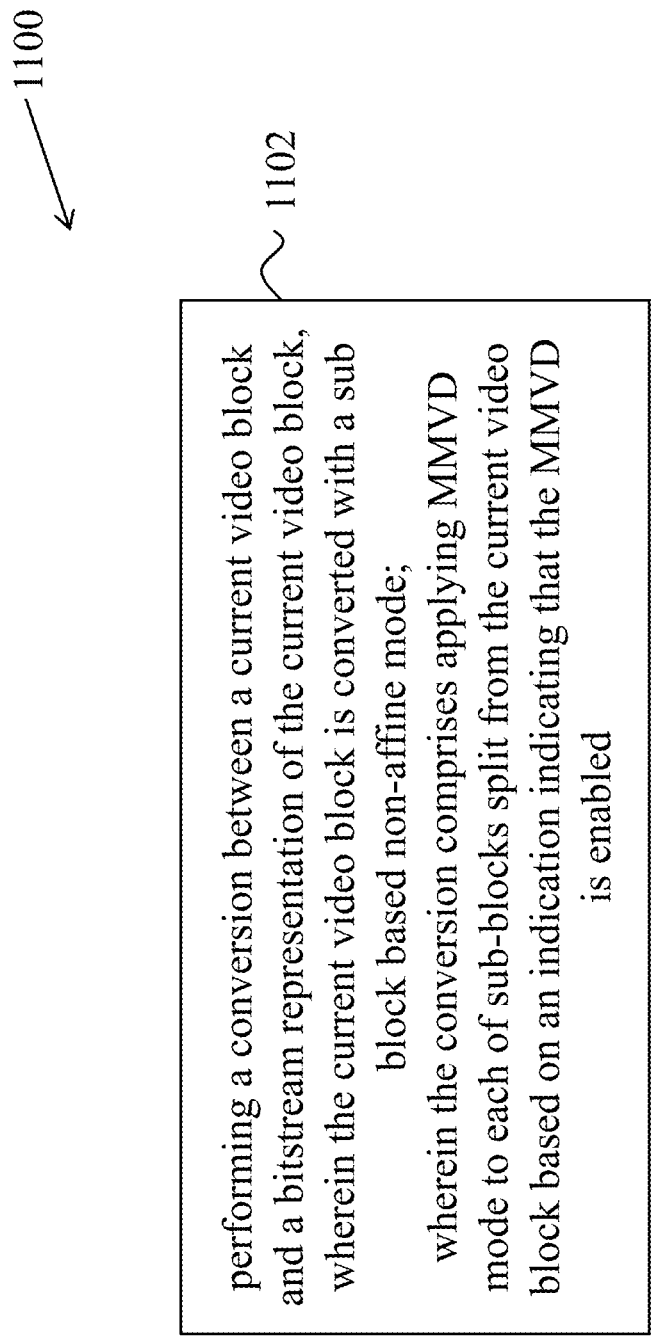
FIG. 11 is a flowchart for another example method for video processing.

FIG. 11 is a flowchart for an example method 1100 for video processing. The method 1100 includes: performing a conversion (1102) between a current video block and a bitstream representation of the current video block, wherein the current video block is converted with a sub-block based non-affine mode; wherein the conversion comprises applying MMVD mode to each of sub-blocks split from the current video block based on an indication indicating that the MMVD is enabled.

Figure 12:
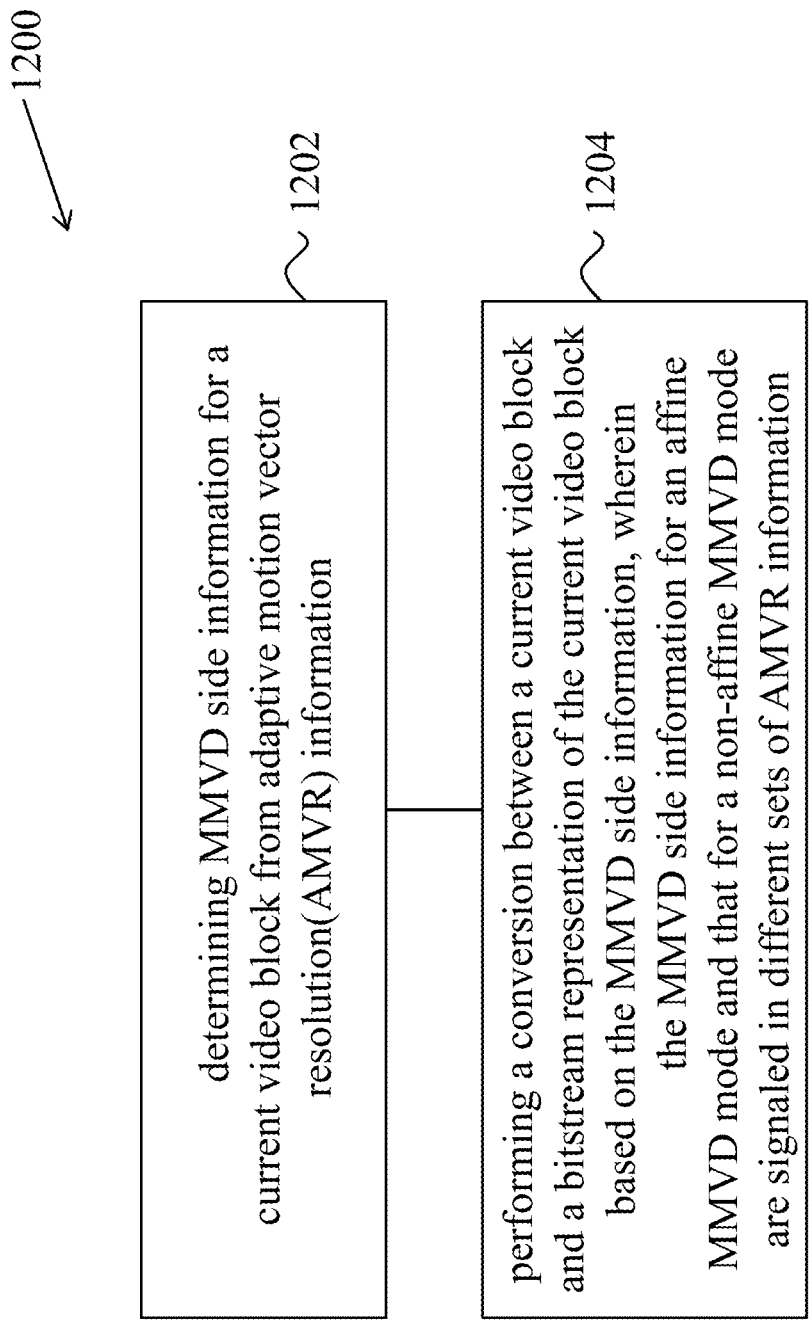
FIG. 12 is a flowchart for yet another example method for video processing.

FIG. 12 is a flowchart for an example method 1200 for video processing. The method 1200 includes: determining (1202) MMVD side information for a current video block from adaptive motion vector resolution (AMVR) information; and performing (1204) a conversion between a current video block and a bitstream representation of the current video block based on the MMVD side information, wherein the MMVD side information for an affine MMVD mode and that for a non-affine MMVD mode are signaled in different sets of AMVR information.

Figure 13:
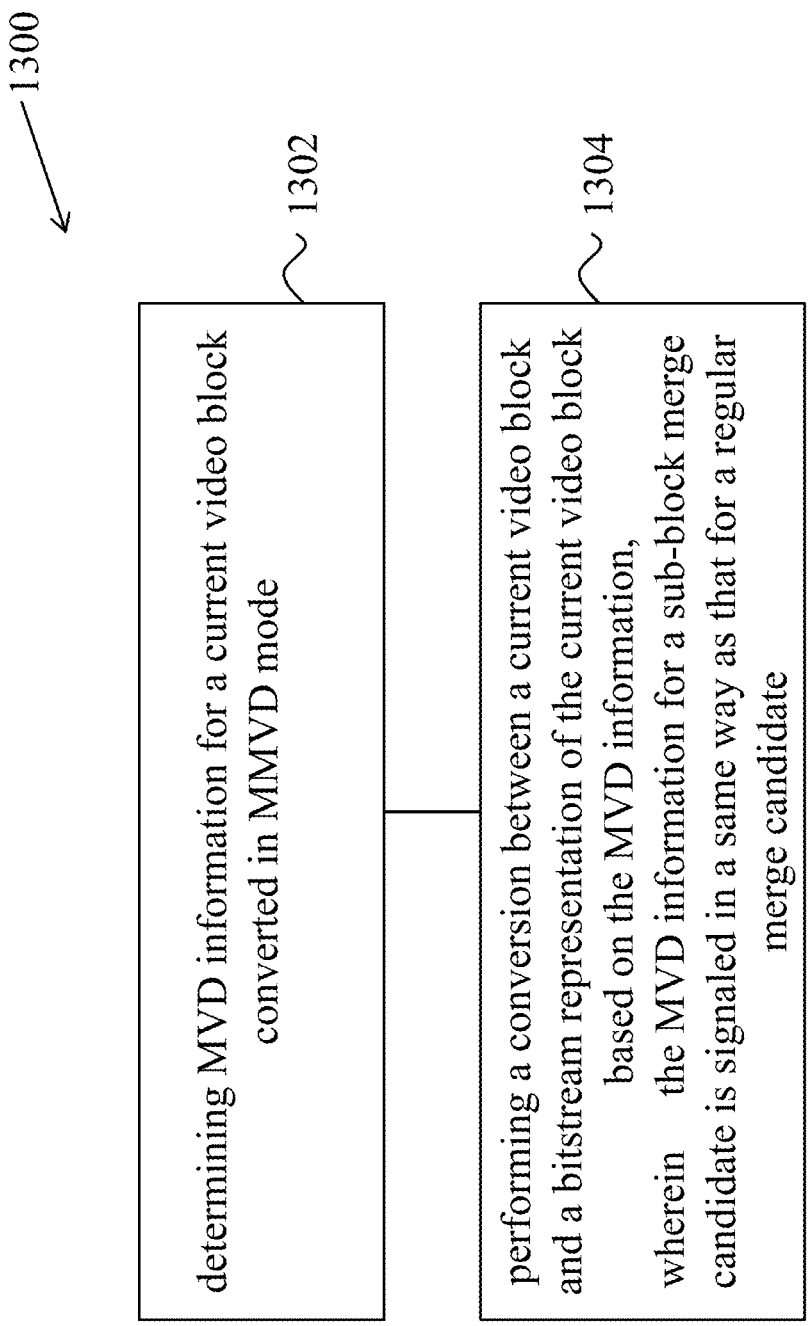
FIG. 13 is a flowchart for yet another example method for video processing.

FIG. 13 is a flowchart for an example method 1300 for video processing. The method 1300 includes: determining (1302) MVD information for a current video block converted in MMVD mode; performing (1304) a conversion between a current video block and a bitstream representation of the current video block based on the MVD information, wherein the MVD information for a sub-block merge candidate is signaled in a same way as that for a regular merge candidate.

Figure 14:
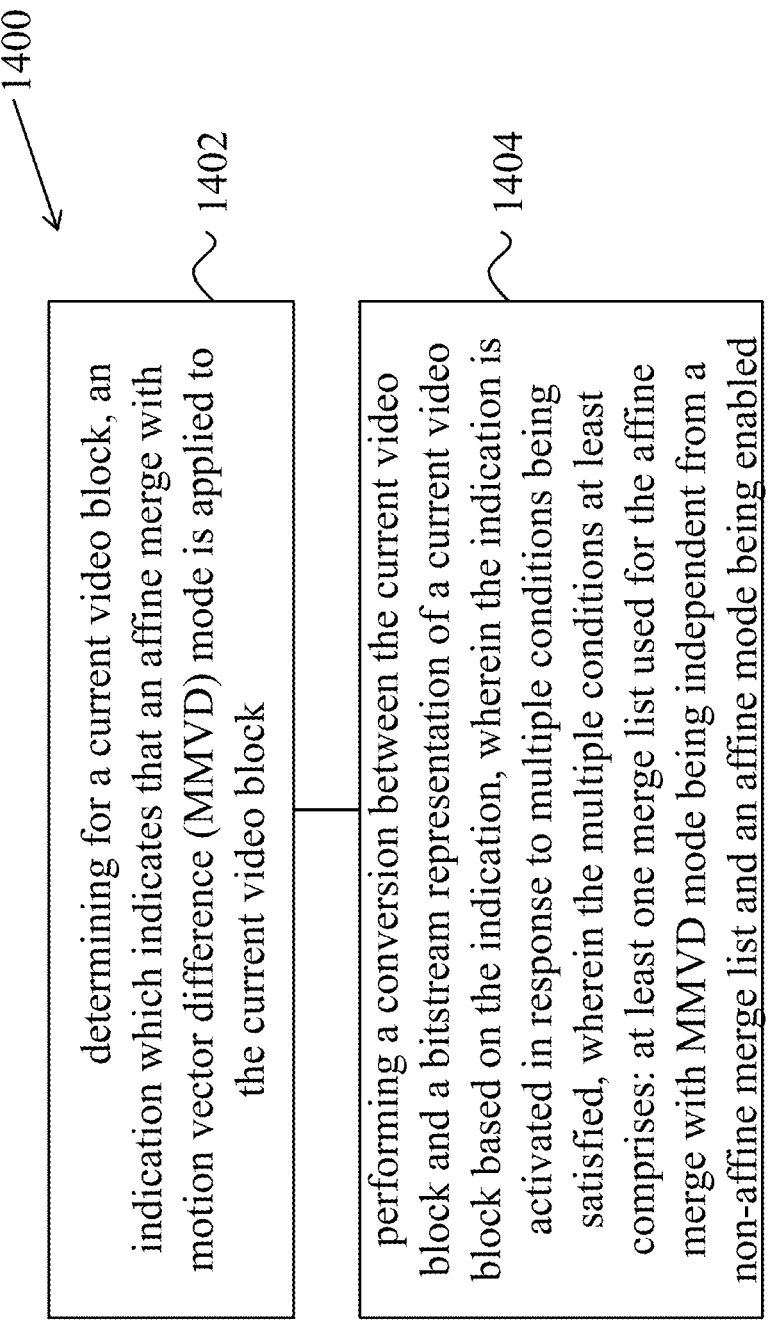
FIG. 14 is a flowchart for another example method for video processing.

FIG. 14 is a flowchart for an example method 1300 for video processing. The method 1400 includes: determining (1402) for a current video block, an indication which indicates that an affine merge with motion vector difference (MMVD) mode is applied to the current video block; performing (1404) a conversion between the current video block and a bitstream representation of a current video block based on the indication, wherein the indication is activated in response to multiple conditions being satisfied, wherein the multiple conditions at least comprises: at least one merge list used for the affine merge with MMVD mode being independent from a non-affine merge list and an affine mode being enabled.

Figure 15:
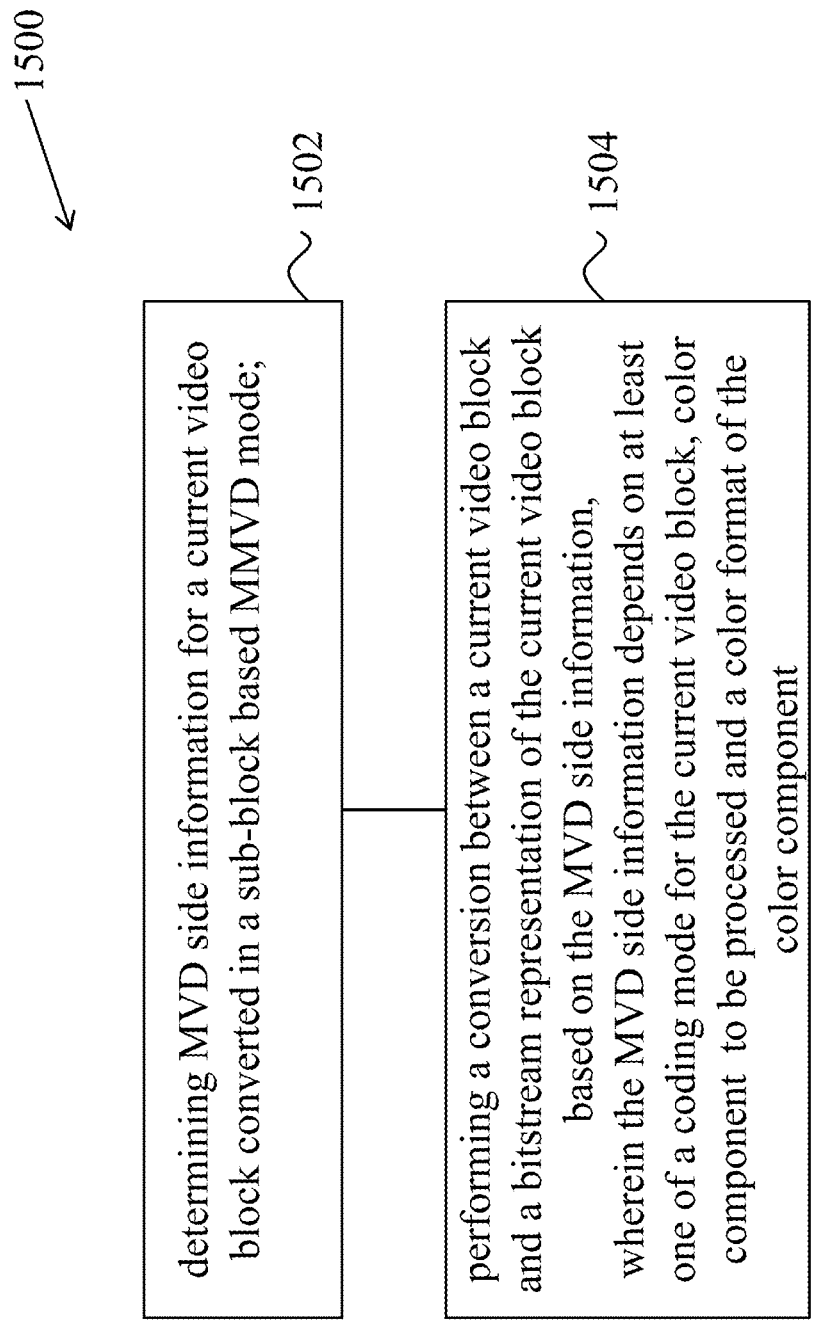
FIG. 15 is a flowchart for another example method for video processing.

FIG. 15 is a flowchart for an example method 1500 for video processing. The method 1500 includes: determining (1502) MVD side information for a current video block converted in a sub-block based MMVD mode; performing (1504) a conversion between a current video block and a bitstream representation of the current video block based on the MVD side information, wherein the MVD side information depends on at least one of a coding mode for the current video block, color component to be processed and a color format of the color component.

With reference to the methods 1000, 1100, 1200, 1300, 1400 and 1500 some examples of motion vector signaling are described in Section 4 of this document, and the aforementioned methods may include the features and steps described below.

In one aspect, there is disclosed a method for video processing, comprising: determining for a current video block, an indication which indicates that an affine merge with motion vector difference (MMVD) mode is applied to the current video block;

performing a conversion between the current video block and a bitstream representation of a current video block based on the indication, wherein the indication is activated based on the usage of at least one merge list for the current video block.

In one example, the at least one merge list comprise a sub-block merge list, and the indication is activated if a merge index of the sub-block merge list is larger than K, wherein K is an integer.

In one example, K=0 or K=1.

In one example, in the affine merge with MMVD mode, a motion vector difference (MVD) indicated in the MMVD side information is added to a motion vector of a sub-block of the current video block acquired based on a candidate of the at least one merge list.

In another aspect, there is disclosed a method for video processing, comprising: determining for a current video block, an indication which indicates that an affine merge with motion vector difference (MMVD) mode is applied to the current video block;

performing a conversion between the current video block and a bitstream representation of a current video block based on the indication, wherein the indication is activated in response to multiple conditions being satisfied, wherein the multiple conditions at least comprises: at least one merge list used for the affine merge with MMVD mode being independent from a non-affine merge list and an affine mode being enabled.

In an example, the multiple conditions further comprises there being more than one base affine candidate in the at least one merge list.

In an example, tin the affine merge with MMVD mode, a motion vector difference (MVD) is added to a motion vector of a sub-block of the current video block acquired based on a candidate of the at least one merge list.

In one example, the at least one merge list comprises an affine merge list and a non-affine merge list, and the indication is activated if an affine mode is enabled and there are more than one base affine candidate in the affine merge list.

In one aspect, there is disclosed a method for video processing, comprising: performing a conversion between a current video block and a bitstream representation of the current video block, wherein the current video block is converted with a sub-block based non-affine mode; wherein the conversion comprises applying MMVD mode to each of sub-blocks split from the current video block based on an indication indicating that the MMVD is enabled.

In one example, the sub-block based non-affine mode is an subblock based temporal motion vector prediction (sbTMVP) mode, and the indication is a binary flag.

In one example, a set of MMVD side information is shared between all sub-blocks.

In one example, different sets of MMVD side information are used for different sub-blocks.

In one example, motion vector difference (MVD) indicated in the MMVD side information is added to a motion vector of each of the plurality of sub-blocks.

In one example, a sub-block merge list is used for the current video block, and the sub-block merge list comprises a sbTMVP merge candidate.

In one example, the MMVD side information is signaled for the sbTMVP merge candidate in a same way as for the sub-block based affine merge candidate.

In one example, for the sbTMVP merge candidate, a picture order count (POC) distance based offset mirroring is used for a bi-prediction to add the MVD to the MV of the sub-block acquired based on the sbTMVP merge candidate.

In one aspect, there is disclosed a method for video processing, comprising: determining MMVD side information for a current video block from adaptive motion vector resolution (AMVR) information; and performing a conversion between a current video block and a bitstream representation of the current video block based on the MMVD side information, wherein the MMVD side information for an affine MMVD mode and that for a non-affine MMVD mode are signaled in different sets of AMVR information.

In one example, the AMVR information signaling the MMVD side information for the affine MMVD mode further signals a MV precision used in an affine inter-mode, and the AMVR information signaling the MMVD side information for the non-affine MMVD mode further signals the MV precision used in a non-affine inter-mode.

In one aspect, there is disclosed a method for video processing, comprising: determining MVD information for a current video block converted in MMVD mode;

performing a conversion between a current video block and a bitstream representation of the current video block based on the MVD information, wherein the MVD information for a sub-block merge candidate is signaled in a same way as that for a regular merge candidate.

In one example, the sub-block merge candidate and the regular merge candidate share at least one of a same distance table indicating a mapping between at least one distance index and at least one distance offset from a starting point, a same mapping between a distance index and a distance, a same direction representing a direction of the MVD relative to the starting point, a same binarization manner, and same arithmetic coding contexts.

In one example, the MMVD side information is signaled or pre-defined.

In one aspect, there is disclosed a method for video processing, comprising: determining MVD side information for a current video block converted in a sub-block based MMVD mode; performing a conversion between a current video block and a bitstream representation of the current video block based on the MVD side information, wherein the MVD side information depends on at least one of a coding mode for the current video block, color component to be processed and a color format of the color component.

In one example, the coding mode comprises at least one of affine merge mode, normal merge mode, triangular merge mode or sbTMVP mode.

In one example, the color format comprises at least one of 4:2:0, 4:2:2 and 4:4:4.

In an example, the conversion includes encoding the current video block into the bitstream representation of the current video block and decoding the current video block from the bitstream representation of the current video block.

In an aspect, there is disclosed an apparatus in a video system, the apparatus comprising a processor and a non-transitory memory with instructions thereon, wherein the instructions upon execution by the processor, cause the processor to implement the method in any one of examples described as above.

In an aspect, there is disclosed a computer program product stored on a non-transitory computer readable media, the computer program product including program code for carrying out the method in any one of examples described as above.

Figure 16:
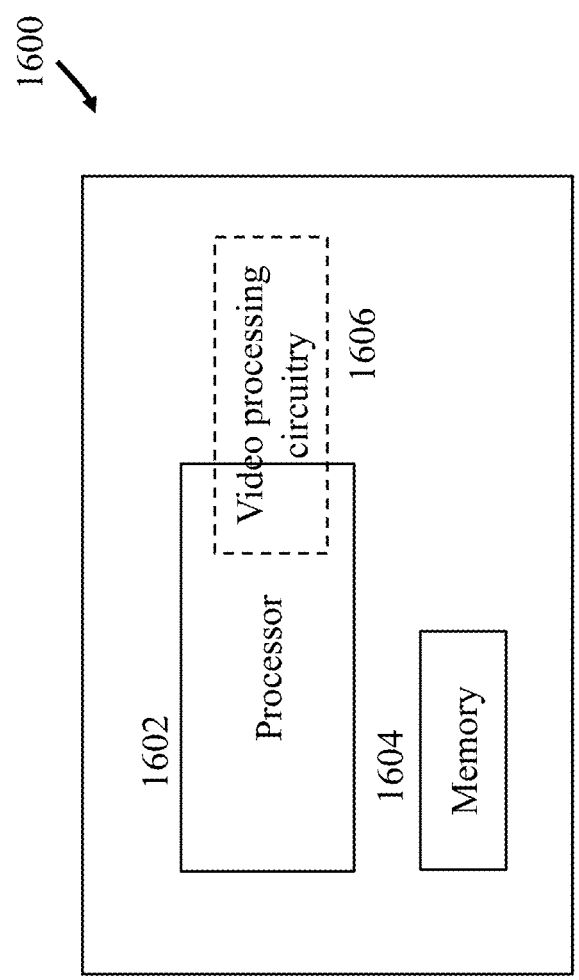
FIG. 16 shows an example of a hardware platform for implementing a technique described in the present document.

FIG. 16 is a block diagram of a video processing apparatus 1600. The apparatus 1600 may be used to implement one or more of the methods described herein. The apparatus 1600 may be embodied in a smartphone, tablet, computer, Internet of Things (IoT) receiver, and so on. The apparatus 1600 may include one or more processors 1602, one or more memories 1604 and video processing hardware 1606. The processor(s) 1602 may be configured to implement one or more methods described in the present document. The memory (memories) 1604 may be used for storing data and code used for implementing the methods and techniques described herein. The video processing hardware 1606 may be used to implement, in hardware circuitry, some techniques described in the present document, and may be partly or completely be a part of the processors 1602 (e.g., graphics processor core GPU or other signal processing circuitry).

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that several techniques have been disclosed that will benefit video encoder and decoder embodiments incorporated within video processing devices such as smartphones, laptops, desktops, and similar devices by allowing the use of virtual motion candidates that are constructed based on various rules disclosed in the present document.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method for video processing, comprising:
   determining that an affine mode is enabled for a first block of a video;
   in response to the affine mode being enabled for the first block, determining whether a first ultimate motion vector expression mode related with the affine mode is applied to the first block;
   in response to the first ultimate motion vector expression mode related with the affine mode being applied to the first block, determining a first ultimate motion vector expression mode information for the first block, wherein the first ultimate motion vector expression mode information comprises a first distance index and a first direction information, the first distance index indicates an offset of a refined motion information respective to an original motion information of the first block and the first direction information indicates a direction of the offset; and
   performing a conversion between the first block and a bitstream of the video using the first ultimate motion vector expression mode information,
   wherein a second ultimate motion vector expression mode related with a non-affine mode is applied to a second block coded with the non-affine mode, wherein the second ultimate motion vector expression mode corresponds to a second ultimate motion vector expression mode information, and wherein the second ultimate motion vector expression mode information comprises a second distance index indicating an offset of a refined motion information respective to an original motion information of the second block and a second direction information indicating a direction of the offset.

2. The method of claim 1, wherein the non-affine mode is one of a regular merge mode, a sub-block based temporal motion vector prediction mode, a mode in which the first block comprises at least two partitions, at least one of which is non-square and non-rectangular.

3. The method of claim 1, wherein the offset corresponding to the first block and the offset corresponding to the second block are determined based on a same mapping between distances and offsets.

4. The method of claim 1, wherein the first direction information and the second direction information are coded with a same binarization method.

5. The method of claim 1, wherein whether the second ultimate motion vector expression mode related with the non-affine mode is enabled based on whether the non-affine mode is enabled.

6. The method of claim 1, wherein the first ultimate motion vector expression mode information comprises a first predefined information and the second ultimate motion vector expression mode information comprises a second predefined information, wherein the first predefined information and the second predefined information are respectively based on the first ultimate motion vector expression mode and the second ultimate motion vector expression mode.

7. The method of claim 1, wherein the conversion includes encoding the first block into the bitstream.

8. The method of claim 1, wherein the conversion includes decoding the first block from the bitstream.

9. An apparatus for processing video data comprising a processor and a non-transitory memory with instructions thereon, wherein the instructions upon execution by the processor, cause the processor to:
   determine that an affine mode is enabled for a first block of a video;
   in response to the affine mode being enabled for the first block, determine whether a first ultimate motion vector expression mode related with the affine mode is applied to the first block;
   in response to the first ultimate motion vector expression mode related with the affine mode being applied to the first block, determine a first ultimate motion vector expression mode information for the first block, wherein the first ultimate motion vector expression mode information comprises a first distance index and a first direction information, the first distance index indicates an offset of a refined motion information respective to an original motion information of the first block and the first direction information indicates a direction of the offset; and
   perform a conversion between the first block and a bitstream of the video using the first ultimate motion vector expression mode information,
   wherein a second ultimate motion vector expression mode related with a non-affine mode is applied to a second block coded with the non-affine mode, wherein the second ultimate motion vector expression mode corresponds to a second ultimate motion vector expression mode information, wherein the second ultimate motion vector expression mode information comprises a second distance index indicating an offset of a refined motion information respective to an original motion information of the second block and a second direction information indicating a direction of the offset.

10. The apparatus of claim 9, wherein the non-affine mode is one of a regular merge mode, a sub-block based temporal motion vector prediction mode, a mode in which the first block comprises at least two partitions, at least one of which is non-square and non-rectangular.

11. The apparatus of claim 9, wherein the offset corresponding to the first block and the offset corresponding to the second block are determined based on a same mapping between distances and offsets.

12. The apparatus of claim 9, wherein the first direction information and the second direction information are coded with a same binarization method.

13. The apparatus of claim 9, wherein whether the second ultimate motion vector expression mode related with the non-affine mode is enabled based on whether the non-affine mode is enabled.

14. The apparatus of claim 9, wherein the first ultimate motion vector expression mode information comprises a first predefined information and the second ultimate motion vector expression mode information comprises a second predefined information, wherein the first predefined information and the second predefined information are respectively based on the first ultimate motion vector expression mode and the second ultimate motion vector expression mode.

15. The apparatus of claim 9, wherein the conversion includes encoding the first block into the bitstream.

16. The apparatus of claim 9, wherein the conversion includes decoding the first block from the bitstream.

17. A non-transitory computer-readable storage medium storing instructions that cause a processor to:
   determine that an affine mode is enabled for a first block of a video;
   in response to the affine mode being enabled for the first block, determine whether a first ultimate motion vector expression mode related with the affine mode is applied to the first block;
   in response to the first ultimate motion vector expression mode related with the affine mode being applied to the first block, determine a first ultimate motion vector expression mode information for the first block, wherein the first ultimate motion vector expression mode information comprises a first distance index and a first direction information, the first distance index indicates an offset of a refined motion information respective to an original motion information of the first block and the first direction information indicates a direction of the offset; and
   perform a conversion between the first block and a bitstream of the video using the first ultimate motion vector expression mode information;
   wherein a second ultimate motion vector expression mode related with a non-affine mode is applied to a second block coded with the non-affine mode, wherein the second ultimate motion vector expression mode corresponds to a second ultimate motion vector expression mode information, wherein the second ultimate motion vector expression mode information comprises a second distance index indicating an offset of a refined motion information respective to an original motion information of the second block and a second direction information indicating a direction of the offset.

18. A method for storing a bitstream of a video, comprising:
   determining that an affine mode is enabled for a first block of the video;

in response to the affine mode being enabled for the first block, determining whether a first ultimate motion vector expression mode related with the affine mode is applied to the first block;

in response to the first ultimate motion vector expression mode related with the affine mode being applied to the first block, determining a first ultimate motion vector expression mode information for the first block, wherein the first ultimate motion vector expression mode information comprises a first distance index and a first direction information, the first distance index indicates an offset of a refined motion information respective to an original motion information of the first block and the first direction information indicates a direction of the offset;

generating the bitstream using the first ultimate motion vector expression mode information; and storing the bitstream in a non-transitory computer-readable recording medium, wherein a second ultimate motion vector expression mode related with a non-affine mode is applied to a second block coded with the non-affine mode, wherein the second ultimate motion vector expression mode corresponds to a second ultimate motion vector expression mode information, wherein the second ultimate motion vector expression mode information comprises a second distance index indicating an offset of a refined motion information respective to an original motion information of the second block and a second direction information indicating a direction of the offset.

* * * * *